US012253762B2

(12) United States Patent
Ikeda et al.

(10) Patent No.: US 12,253,762 B2
(45) Date of Patent: Mar. 18, 2025

(54) OPTICAL ELEMENT INCLUDING STACKED LIQUID CRYSTAL CELLS

(71) Applicant: Japan Display Inc., Tokyo (JP)

(72) Inventors: Kojiro Ikeda, Tokyo (JP); Takeo Koito, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 18/647,842

(22) Filed: Apr. 26, 2024

(65) Prior Publication Data

US 2024/0272487 A1 Aug. 15, 2024

Related U.S. Application Data

(63) Continuation of application No. PCT/JP2022/032203, filed on Aug. 26, 2022.

(30) Foreign Application Priority Data

Nov. 1, 2021 (JP) .................. 2021-179072

(51) Int. Cl.
G02F 1/1337 (2006.01)
G02F 1/1343 (2006.01)

(52) U.S. Cl.
CPC .. G02F 1/133784 (2013.01); G02F 1/133788 (2013.01); G02F 1/13439 (2013.01)

(58) Field of Classification Search
None
See application file for complete search history.

(56) References Cited

U.S. PATENT DOCUMENTS

2005/0243237 A1 11/2005 Sasuga
2010/0149444 A1* 6/2010 Hikmet ............ G02F 1/134363
349/122
(Continued)

FOREIGN PATENT DOCUMENTS

JP 2005-317879 A 11/2005
JP 2010-230887 A 10/2010
(Continued)

OTHER PUBLICATIONS

Search Report issued in related International Patent Application No. PCT/JP2022/032203 mailed on Oct. 25, 2022 and English translation of same. 5 pages.
(Continued)

*Primary Examiner* — Ryan Crockett
(74) *Attorney, Agent, or Firm* — K&L Gates LLP

(57) ABSTRACT

A first liquid crystal cell of a plurality of liquid crystal cells of an optical element includes a first alignment film covering first and second transparent electrodes on a first substrate, a second alignment film covering third and fourth transparent electrodes on a second substrate, and a liquid crystal layer between the first substrate and the second substrate. The first liquid crystal cell includes the first and second transparent electrodes extending in a first direction, the third and fourth transparent electrodes extending in a second direction, the first alignment film aligning liquid crystal molecules in the liquid crystal layer in the second direction when no voltages are applied to the first and second transparent electrodes, and the second alignment film aligning liquid crystal molecules in the liquid crystal layer in the second direction when no voltages are applied to the third and fourth transparent electrodes.

9 Claims, 13 Drawing Sheets

(56) References Cited

U.S. PATENT DOCUMENTS

| | | | |
|---|---|---|---|
| 2011/0059670 A1* | 3/2011 | Jin | G02F 1/1323 |
| | | | 445/24 |
| 2014/0368776 A1 | 12/2014 | Kadomi et al. | |
| 2016/0203785 A1 | 7/2016 | Cho et al. | |
| 2016/0252782 A1* | 9/2016 | Wang | G02F 1/134309 |
| | | | 349/96 |
| 2018/0196318 A1* | 7/2018 | Presniakov | G02F 1/134363 |
| 2019/0025657 A1* | 1/2019 | Presniakov | G02F 1/133504 |
| 2019/0294020 A1 | 9/2019 | Galstian et al. | |
| 2020/0050076 A1* | 2/2020 | Galstian | G02B 27/0927 |
| 2021/0255498 A1* | 8/2021 | Wu | G02F 1/1337 |
| 2022/0128869 A1* | 4/2022 | Tanaka | G02F 1/1347 |
| 2022/0187647 A1* | 6/2022 | Nagasawa | G02F 1/1347 |
| 2022/0373831 A1* | 11/2022 | Koito | G02F 1/13756 |
| 2023/0359091 A1* | 11/2023 | Kurokawa | G02F 1/13439 |
| 2023/0418108 A1* | 12/2023 | Ikeda | G02F 1/134309 |
| 2023/0418119 A1* | 12/2023 | Ikeda | G02F 1/13471 |
| 2024/0004243 A1* | 1/2024 | Koito | G02F 1/13471 |
| 2024/0045276 A1* | 2/2024 | Koito | G02F 1/133368 |
| 2024/0045282 A1* | 2/2024 | Ikeda | G02F 1/133773 |
| 2024/0184170 A1* | 6/2024 | Ikeda | G02F 1/1343 |

FOREIGN PATENT DOCUMENTS

| | | |
|---|---|---|
| JP | 2012-128276 A | 7/2012 |
| JP | 2014-160277 A | 9/2014 |
| KR | 10-2014-0125768 A | 10/2014 |
| KR | 10-2016-0087045 A | 7/2016 |
| WO | WO2021/157225 A1 | 8/2021 |

OTHER PUBLICATIONS

Written Opinion issued in related International Patent Application No. PCT/JP2022/032203 mailed on Oct. 25, 2022. 4 pages.

English translation of Office Action issued in related Japanese Patent Application No. 2023-556145 dated Oct. 1, 2024. 6 pages.

English translation of Office Action issued in related Korean Patent Application No. 10-2024-7012731, mailed Oct. 19, 2024. 12 pages.

* cited by examiner

OPTICAL ELEMENT INCLUDING STACKED LIQUID CRYSTAL CELLS

CROSS-REFERENCE TO RELATED APPLICATIONS

This application is a Continuation of International Patent Application No. PCT/JP2022/032203, filed on Aug. 26, 2022, which claims the benefit of priority to Japanese Patent Application No. 2021-179072, filed on Nov. 1, 2021, the entire contents of which are incorporated herein by reference.

FIELD

An embodiment of the present invention relates to an optical element that controls a distribution of light emitted from a light source.

BACKGROUND

An optical element which is a so-called liquid crystal lens has been conventionally known in which a change in the refractive index of a liquid crystal is utilized by adjusting a voltage applied to the liquid crystal (for example, see Japanese laid-open patent publication No. 2005-317879, 2010-230887, or 2014-160277). For example, the lighting devices disclosed in the Japanese laid-open patent publications Nos. 2005-317879 and 2010-230877 use a liquid crystal lens to distribute light from a light source in a circular shape. Further, the beam shaping device disclosed in the Japanese laid-open patent publication No. 2014-160277 changes the distribution shape of light by changing patterns of an electrode applied to a liquid crystal.

SUMMARY

An optical element according to an embodiment of the present invention includes a plurality of stacked liquid crystal cells. The plurality of liquid crystal cells each includes a first substrate on which a first transparent electrode, a second transparent electrode, and a first alignment film covering the first transparent electrode and the second transparent electrode are provided, a second substrate on which a third transparent electrode, a fourth transparent electrode, and a second alignment film covering the third transparent electrode and the fourth transparent electrode are provided, and a liquid crystal layer between the first substrate and the second substrate. The plurality of liquid crystal cells includes a first liquid crystal cell. The first liquid crystal cell includes the first transparent electrode and the second transparent electrode extending in a first direction, the third transparent electrode and the fourth transparent electrode extending in a second direction orthogonal to the first direction, the first alignment film aligning liquid crystal molecules in the liquid crystal layer in the second direction when no voltages are applied to the first transparent electrode and the second transparent electrode, and the second alignment film aligning liquid crystal molecules in the liquid crystal layer in the second direction when no voltages are applied to the third transparent electrode and the fourth transparent electrode.

An optical element includes a plurality of stacked liquid crystal cells. The plurality of liquid crystal cells each includes a first substrate on which a first transparent electrode, a second transparent electrode, and a first alignment film covering the first transparent electrode and the second transparent electrode are provided, a second substrate on which a third transparent electrode, a fourth transparent electrode, and a second alignment film covering the third transparent electrode and the fourth transparent electrode are provided, and a liquid crystal layer between the first substrate and the second substrate. The plurality of liquid crystal cells includes a first liquid crystal cell. The first liquid crystal cell includes the first transparent electrode and the second transparent electrode extending in a first direction, the third transparent electrode and the fourth transparent electrode extending in the first direction, the first alignment film aligning liquid crystal molecules in the liquid crystal layer in a second direction orthogonal to the first direction when no voltages are applied to the first transparent electrode and the second transparent electrode, and the second alignment film aligning liquid crystal molecules in the liquid crystal layer in the second direction when no voltages are applied to the third transparent electrode and the fourth transparent electrode.

An optical element includes a plurality of stacked liquid crystal cells. The plurality of liquid crystal cells each includes a first substrate on which a first transparent electrode, a second transparent electrode, and a first alignment film covering the first transparent electrode and the second transparent electrode are provided, a second substrate on which a third transparent electrode, a fourth transparent electrode, and a second alignment film covering the third transparent electrode and the fourth transparent electrode are provided, and a liquid crystal layer between the first substrate and the second substrate. The plurality of liquid crystal cells includes a first liquid crystal cell. The first liquid crystal cell includes the first transparent electrode and the second transparent electrode extending in a first direction, the third transparent electrode and the fourth transparent electrode extending in the first direction, the first alignment film aligning liquid crystal molecules in the liquid crystal layer in a second direction orthogonal to the first direction when no voltages are applied to the first transparent electrode and the second transparent electrode, and the second alignment film aligning liquid crystal molecules in the liquid crystal layer in the first direction when no voltages are applied to the third transparent electrode and the fourth transparent electrode.

DESCRIPTION OF EMBODIMENTS

Figure 1:
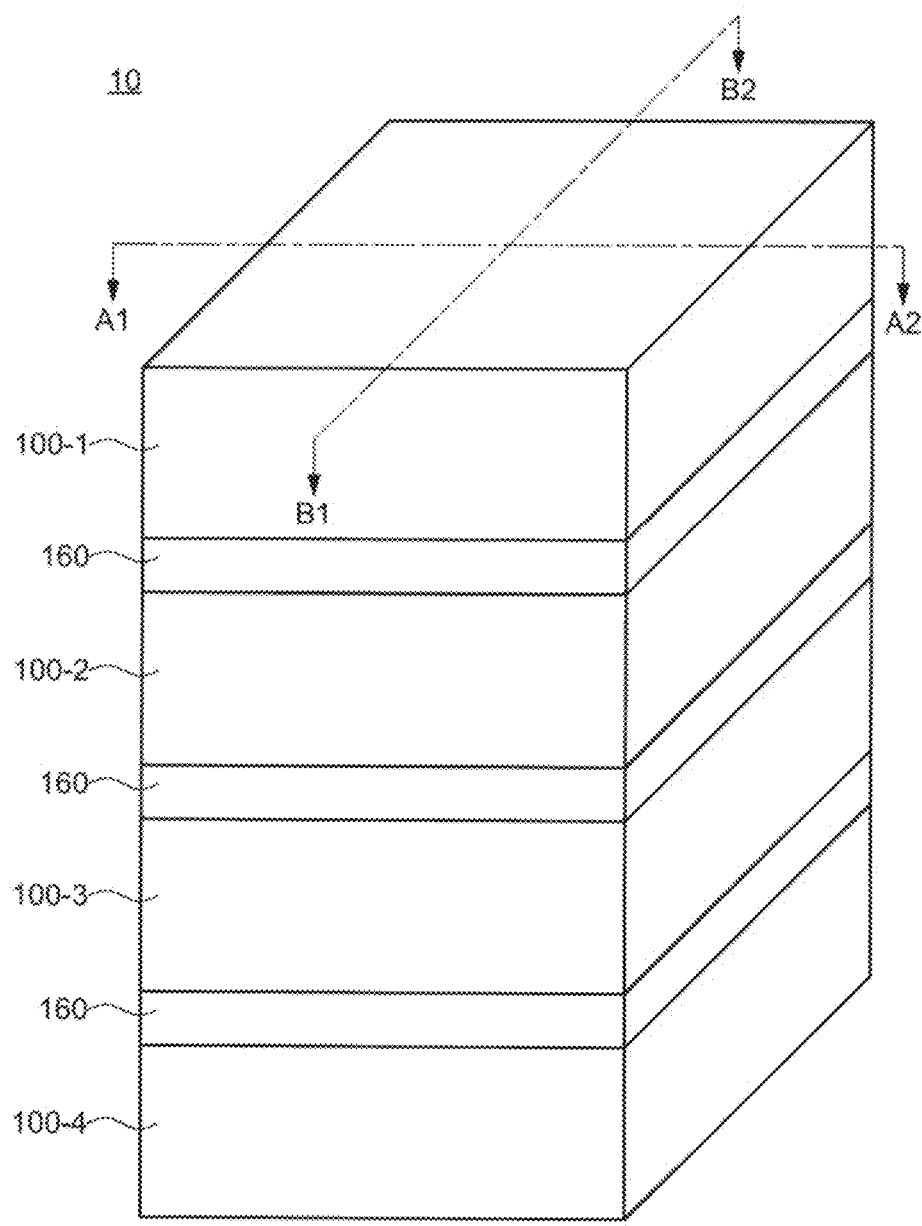
FIG. 1 is a schematic perspective view of an optical element according to an embodiment of the present invention.

For example, an optical element in which liquid crystal cells having a lens function are stacked can change the shape of light incident from a light source using the lens function and emit the light. However, when the shape of the light is changed, the emitted light may cause color unevenness. In particular, in an optical element that greatly changes the shape of light from a light source, when light transmitting through the optical element is irradiated on a wall or the like, color unevenness near the outline of the emitted light may become noticeable.

In view of the above problem, an embodiment of the present invention can provide an optical element in which color unevenness in a light distribution is suppressed.

Hereinafter, each of the embodiments of the present invention is described with reference to the drawings. However, the present invention can be implemented in various modes without departing from the gist of the invention and should not be interpreted as being limited to the description of the embodiments exemplified below.

Although the drawings may be schematically represented in terms of width, thickness, shape, and the like of each part as compared with their actual mode in order to make explanation clearer, they are only an example and an interpretation of the present invention is not limited. In addition, in the drawings, the same reference numerals are provided to the same elements as those described previously with reference to preceding figures and repeated explanations may be omitted accordingly.

In the case when a single film is processed to form a plurality of structural bodies, each structural body may have different functions and roles, and the bases formed beneath each structural body may also be different. However, the plurality of structural bodies is derived from films formed in the same layer by the same process and have the same material. Therefore, the plurality of these films is defined as existing in the same layer.

When expressing a mode in which another structure is arranged over a certain structure, in the case where it is simply described as "over", unless otherwise noted, a case where another structure is arranged directly over a certain structure as if in contact with that structure, and a case where another structure is arranged via another structure over a certain structure, are both included.

First Embodiment

An optical element 10 according to an embodiment of the present invention is described with reference to FIGS. 1 to 4.

[1. Configuration of Optical Element 10]

FIG. 1 is a schematic perspective view of the optical element 10 according to an embodiment of the present invention. As shown in FIG. 1, the optical element 10 includes a plurality of liquid crystal cells 100 (a first liquid crystal cell 100-1, a second liquid crystal cell 100-2, a third liquid crystal cell 100-3, and a fourth liquid crystal cell 100-4) stacked in the z-axis direction. Although not shown in the figures, a light source is placed above the first liquid crystal cell 100-1. Therefore, light emitted from the light source transmits through the first liquid crystal cell 100-1, the second liquid crystal cell 100-2, the third liquid crystal cell 100-3, and the fourth liquid crystal cell 100-4 in order.

Figure 8A:
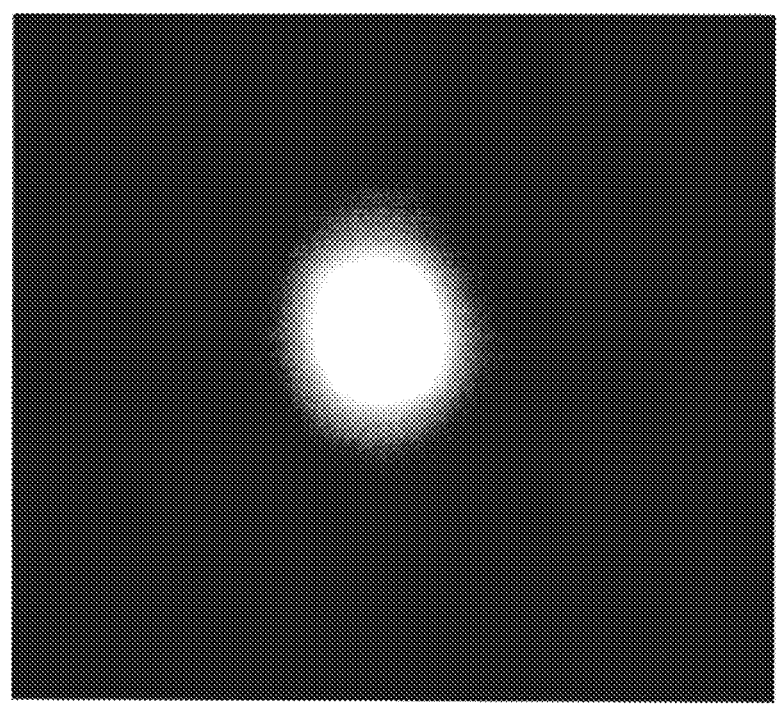
FIG. 8A is a photograph showing transmitted light of an optical element according to an embodiment of the present invention.
Figure 8A:
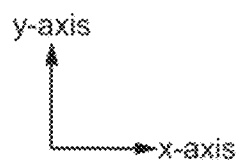
Figure 8B:
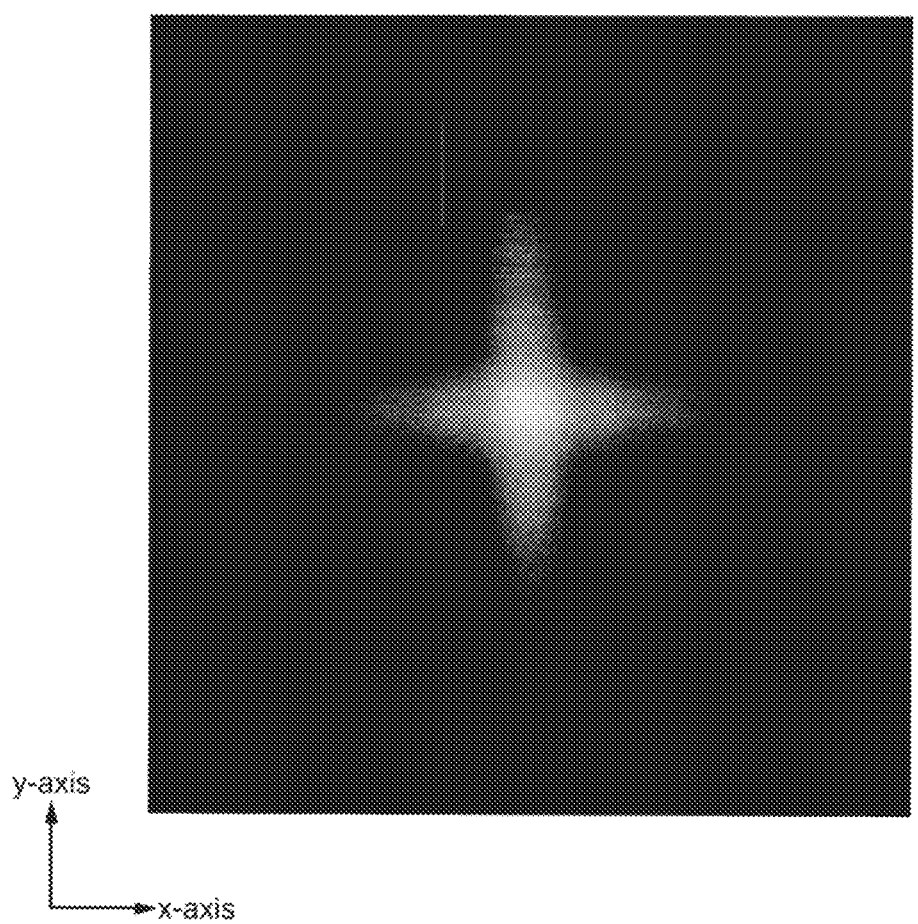
FIG. 8B is a photograph showing a cross-shaped light distribution obtained by controlling an optical element according to an embodiment of the present invention.

Light from the light source transmits through the optical element 10. At this time, when no voltages are applied to electrodes of each liquid crystal cell 100 (details of the electrodes are described later.), the light from the light source transmits through the optical element 10 without changing its shape. For example, when the light from the light source has a circular shape, the transmitted light of the optical element 10 maintains a circular shape (see FIG. 8A). On the other hand, when voltages are applied to the electrodes of each liquid crystal cell 100, the shape of the light from the light source changes as the light transmits through the optical element 10. When the light from the light source has a circular shape, the optical element 10 can control a light distribution so that the transmitted light has a cross shape, for example (see FIG. 8B). In addition, when the voltages applied to the electrodes of each liquid crystal cell 100 are adjusted, the shape of the transmitted light of the optical element 10 can be distributed in any shape between the shape shown in FIG. 8A and the shape shown in FIG. 8B.

Two adjacent liquid crystal cells 100 of the plurality of liquid crystal cells 100 are bonded to each other via an optical elastic resin layer 160. For example, a translucent adhesive containing an acrylic resin or an epoxy resin can be used for the optical elastic resin layer 160.

Although four liquid crystal cells 100 are shown in FIG. 1, the number of the liquid crystal cells 100 included in the optical element 10 is not limited to four. However, when the number of the liquid crystal cells 100 increases, the transmittance of the optical element 10 decreases. Therefore, it is preferable that the number of the liquid crystal cells 100 included in the optical element 10 is four.

Figure 2A:
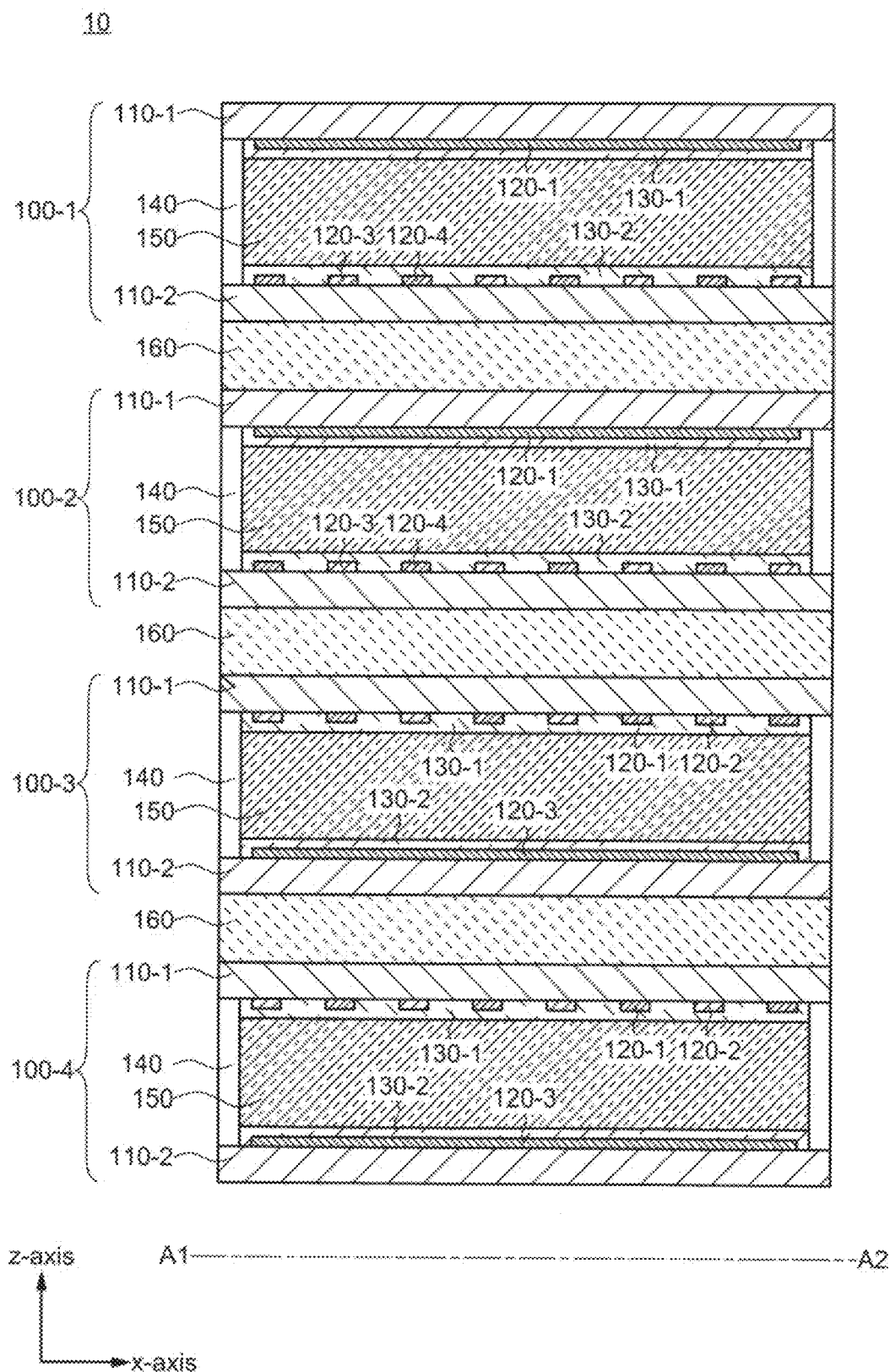
FIG. 2A is a schematic cross-sectional view of an optical element according to an embodiment of the present invention.
Figure 2B:
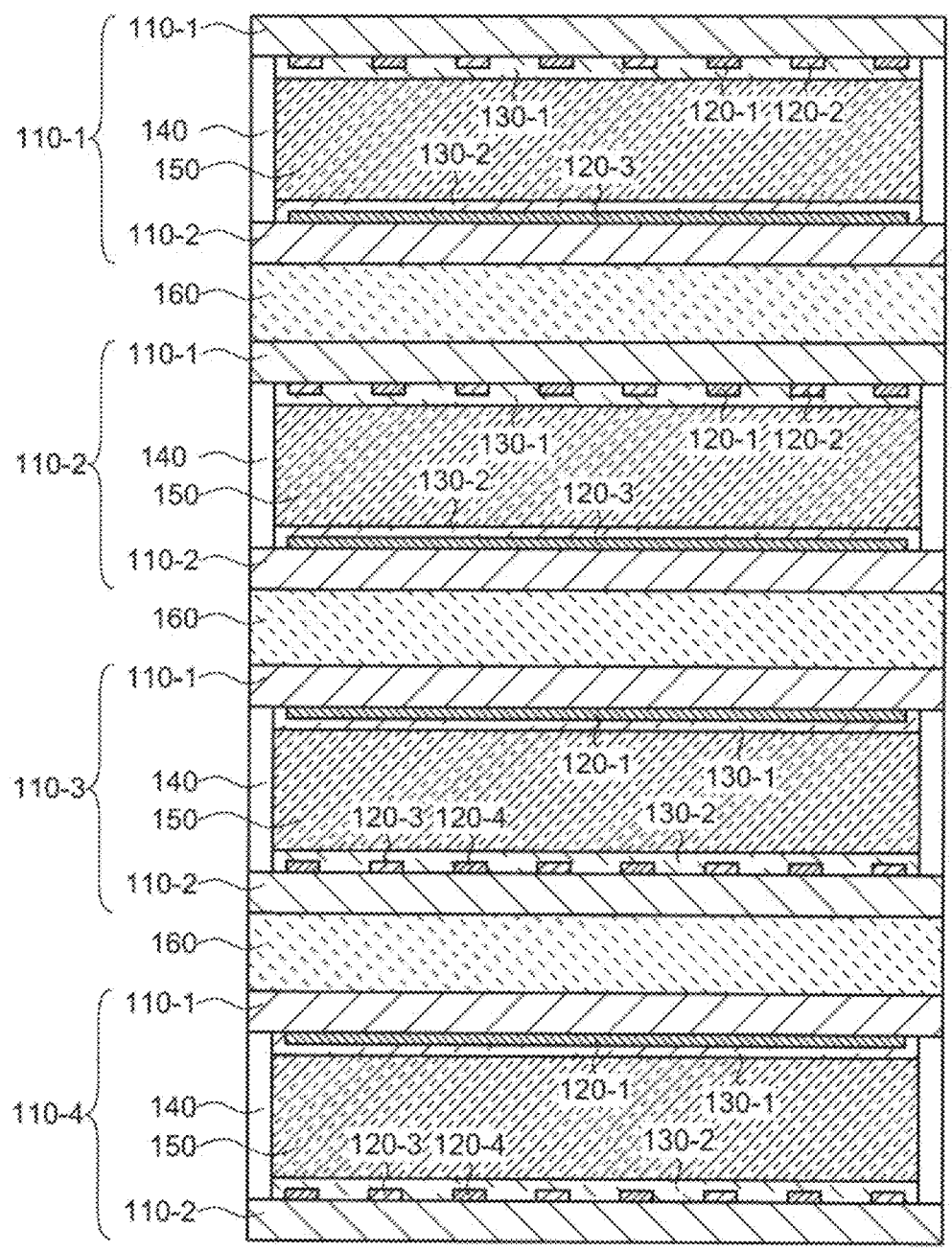
FIG. 2B is a schematic cross-sectional view of an optical element according to an embodiment of the present invention.

FIGS. 2A and 2B are schematic cross-sectional views of the optical element 10 according to an embodiment of the present invention. Specifically, FIG. 2A is a schematic cross-sectional view in a zx plane taken along a line A1-A2 shown in FIG. 1, and FIG. 2B is a schematic cross-sectional view in a yz plane taken along a line B1-B2 shown in FIG. 1. In addition, hereinafter, the x-axis direction and the y-axis direction may be described as a first direction and a second direction, respectively. That is, the second direction is a direction orthogonal to the first direction.

As shown in FIGS. 2A and 2B, each of the plurality of liquid crystal cells 100 includes a first substrate 110-1, a second substrate 110-2, a first transparent electrode 120-1, a second transparent electrode 120-2, a third transparent electrode 120-3, a fourth transparent electrode 120-4, a first alignment film 130-1, a second alignment film 130-2, a sealing member 140, and a liquid crystal layer 150. The first transparent electrode 120-1, the second transparent electrode 120-2, and the first alignment film 130-1 covering the first transparent electrode 120-1 and the second transparent electrode 120-2 are provided on the first substrate 110-1. Further, the third transparent electrode 120-3, the fourth transparent electrode 120-4, and the second alignment film 130-2 covering the third transparent electrode 120-3 and the fourth transparent electrode 120-4 are provided on the second substrate 110-2. The first substrate 110-1 and the second substrate 110-2 are arranged so that the first transparent electrode 120-1 and the second transparent electrode 120-2 on the first substrate 110-1 and the third transparent electrode 120-3 and the fourth transparent electrode 120-4 on the second substrate 110-2 face each other. Further, the first substrate 110-1 and the second substrate 110-2 are bonded to each other via the sealing member 140 that is provided in the peripheral portion of the first substrate 110-1 and the second substrate 110-2. Furthermore, the liquid crystal layer 150 is provided between the first substrate 110-1 and the second substrate 110-2 by sealing a liquid crystal in a space surrounded by the first substrate 110-1 (more specifically, the first alignment film 130-1), the second substrate 110-2 (more specifically, the second alignment film 130-2), and the sealing member 140.

For example, a rigid substrate having light-transmitting properties such as a glass substrate, a quartz substrate, or a sapphire substrate is used as each of the first substrate 110-1 and the second substrate 110-2. Further, a flexible substrate having light-transmitting properties such as a polyimide resin substrate, an acrylic resin substrate, a siloxane resin substrate, or a fluorine resin substrate can also be used as each of the first substrate 110-1 and the second substrate 110-2.

Each of the first transparent electrode 120-1, the second transparent electrode 120-2, the third transparent electrode 120-3, and the fourth transparent electrode 120-4 functions as an electrode for forming an electric field in the liquid crystal layer 150. For example, a transparent conductive material such as indium tin oxide (ITO) or indium zinc oxide (IZO) is used for each of the first transparent electrode 120-1, the second transparent electrode 120-2, the third transparent electrode 120-3, and the fourth transparent electrode 120-4.

The liquid crystal layer 150 can refract transmitted light or change the polarization state of transmitted light according to the alignment state of the liquid crystal molecules. For example, nematic liquid crystal can be used as the liquid crystal of the liquid crystal layer 150. Although a positive liquid crystal is described as the liquid crystal in the present embodiment, a negative liquid crystal can also be adopted by changing the initial alignment directions of the liquid crystal molecules. Further, the liquid crystal preferably contains a chiral agent that imparts twist to the liquid crystal molecules.

Each of the first alignment film 130-1 and the second alignment film 130-2 aligns the liquid crystal molecules in the liquid crystal layer 150 in a predetermined direction. For example, a polyimide resin or the like can be used for each of the first alignment film 130-1 and the second alignment film 130-2. In addition, each of the first alignment film 130-1 and the second alignment film 130-2 may be imparted with alignment properties by an alignment treatment such as a rubbing method or a photo-alignment method. The rubbing method is a method of rubbing the surface of the alignment film in one direction. The photo-alignment method is a method of irradiating an alignment film with linearly polarized ultraviolet rays.

An adhesive material containing epoxy resin, acrylic resin, or the like can be used for the sealing member 140. The adhesive material may be of an ultraviolet curable type or a heat curable type.

As described above, the first liquid crystal cell 100-1, the second liquid crystal cell 100-2, the third liquid crystal cell 100-3, and the fourth liquid crystal cell 100-4 have the same basic structure. However, the arrangement of the transparent electrodes 120 and the alignment properties of the alignment films 130 are different from each other between the first liquid crystal cell 100-1, the second liquid crystal cell 100-2, the third liquid crystal cell 100-3, and the fourth liquid crystal cell 100-4.

In the first liquid crystal cell 100-1 and the second liquid crystal cell 100-2, the first transparent electrode 120-1 and the second transparent electrode 120-2 extend in the x-axis direction, and the third transparent electrode 120-3 and the fourth transparent electrode 120-4 extend in the y-axis direction. That is, in the first liquid crystal cell 100-1 and the second liquid crystal cell 100-2, the extending direction of each of the first transparent electrode 120-1 and the second transparent electrode 120-2 is the x-axis direction, and the extending direction of each of the third transparent electrode 120-3 and the fourth transparent electrode 120-4 is the y-axis direction. The first transparent electrode 120-1 and the second transparent electrode 120-2 have a comb-teeth shape, and the first transparent electrode 120-1 and the second transparent electrode 120-2 are arranged alternately in the y-axis direction. Further, the third transparent electrode 120-3 and the fourth transparent electrode 120-4 have a comb-teeth shape, and the third transparent electrode 120-3 and the fourth transparent electrode 120-4 are arranged alternately in the x-axis direction.

In the third liquid crystal cell 100-3 and the fourth liquid crystal cell 100-4, the first transparent electrode 120-1 and the second transparent electrode 120-2 extend in the y-axis direction, and the third transparent electrode 120-3 and the fourth transparent electrode 120-4 extend in the x-axis direction. That is, in the third liquid crystal cell 100-3 and the fourth liquid crystal cell 100-4, the extending direction of each of the first transparent electrode 120-1 and the second transparent electrode 120-2 is the y-axis direction, and the extending direction of each of the third transparent electrode 120-3 and the fourth transparent electrode 120-4 is the x-axis direction. The first transparent electrode 120-1 and the second transparent electrode 120-2 have a comb-teeth shape, and the first transparent electrode 120-1 and the second transparent electrode 120-2 are arranged alternately in the x-axis direction. Further, the third transparent electrode 120-3 and the fourth transparent electrode 120-4 have a comb-teeth shape, and the third transparent electrode 120-3 and the fourth transparent electrode 120-4 are arranged alternately in the y-axis direction.

In addition, although the extending direction of the first transparent electrode 120-1 and the second transparent electrode 120-2 is orthogonal to the extending direction of the third transparent electrode 120-3 and the fourth transparent electrode 120-4, the extending directions may intersect with a slight deviation (within approximately ±10 degrees) from orthogonality.

Further, the optical element 10 can control a distribution of unpolarized light by including at least two liquid crystal cells 100. Therefore, the optical element 10 does not require providing a pair of polarizing plates that, for example, are provided on the front and back surfaces of the liquid crystal display element.

Here, properties of light transmitting through the liquid crystal cell 100 are described with reference to FIGS. 3A to 3D.

FIGS. 3A to 3D are schematic cross-sectional views illustrating alignment directions of liquid crystal molecules in the liquid crystal layer 150 of the liquid crystal cell 100 and properties of light transmitting through the liquid crystal cell 100 of the optical element 10 according to an embodiment of the present invention. In the liquid crystal cell 100 shown in FIGS. 3A to 3D, the first transparent electrode 120-1 and the second transparent electrode 120-2 extend in the y-axis direction, and the third transparent electrode 120-3 and the fourth transparent electrode 120-4 extend in the x-axis direction.

Figure 3A:
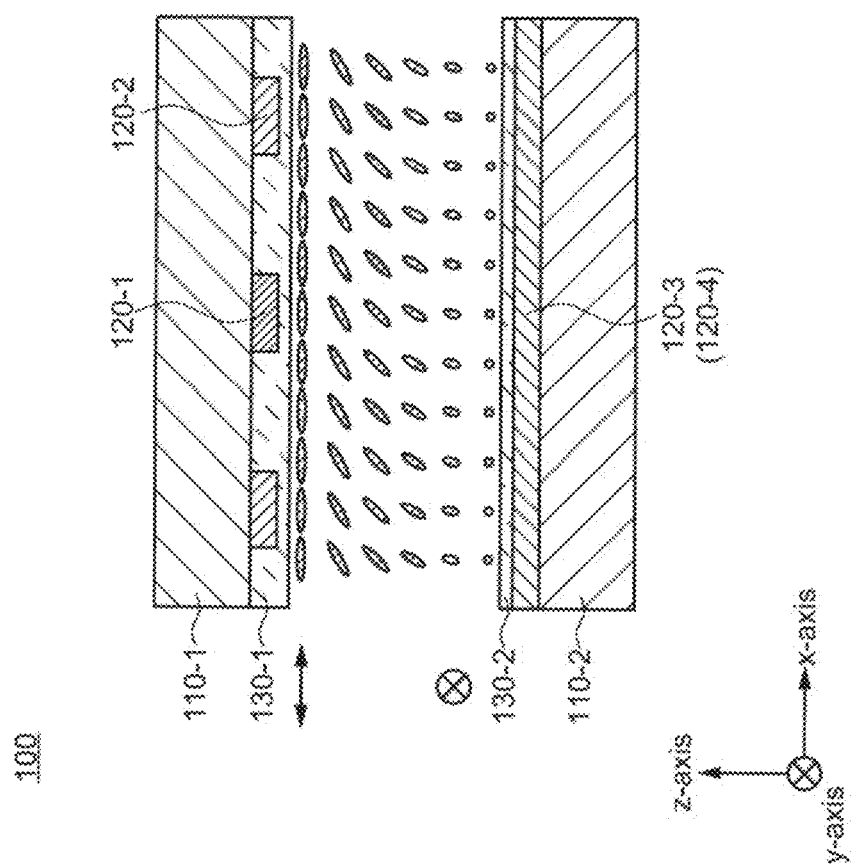
FIG. 3A is a schematic cross-sectional view illustrating alignment directions of liquid crystal molecules in a liquid crystal layer of a liquid crystal cell and properties of light transmitting through the liquid crystal cell of an optical element according to an embodiment of the present invention.

FIG. 3A shows the liquid crystal cell 100 in a state where no voltages are applied to the transparent electrodes 120. The first alignment film 130-1 is aligned in the x-axis direction. Therefore, the long axes of the liquid crystal molecules on the first alignment film 130-1 are aligned along the x-axis direction. In other words, the initial alignment direction of the liquid crystal molecules closer to the first substrate 110-1 is the x-axis direction. The second alignment film 130-2 is aligned in the y-axis direction. Therefore, the long axes of the liquid crystal molecules on the second alignment film 130-2 are aligned along the y-axis direction. In other words, the initial alignment direction of the liquid crystal molecules closer to the second substrate 110-2 is the y-axis direction. In this way, when the initial alignment directions of the liquid crystal molecules intersect between the substrates 110 of the liquid crystal cell 100 (or the alignment directions of the alignment films 130 intersect), the liquid crystal molecules in the liquid crystal layer 150 rotate little by little continuously from the first substrate 110-1 to the second substrate 110-2 and their directions of the long axes change from the x-direction to the y-axis direction, viewed from the thickness direction (z-axis direction) of the liquid crystal layer 150. In addition, hereinafter, when the liquid crystal layer 150 is in the above state, it is said that the liquid crystal layer 150 is in a twisted state. In this case, the polarization axis of light transmitting through the liquid crystal layer 150 is rotated from the x-axis direction to the y-axis direction according to the alignment directions of the liquid crystal molecules. That is, the polarization component of the light transmitting through the liquid crystal layer 150 is rotated. In other words, the light transmitting through the liquid crystal layer 150 has optical rotation.

Figure 3B:
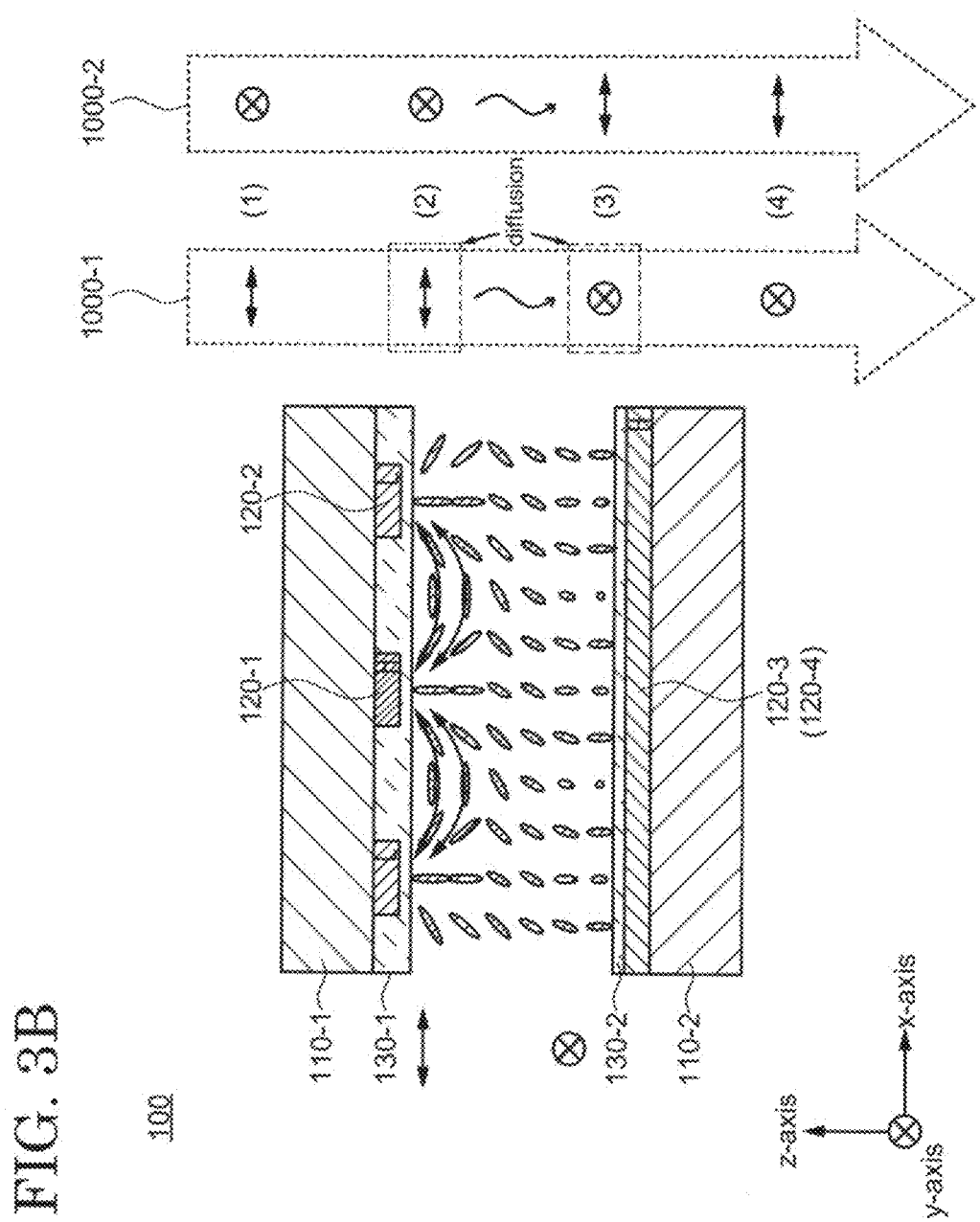
FIG. 3B is a schematic cross-sectional view illustrating alignment directions of liquid crystal molecules in a liquid crystal layer of a liquid crystal cell and properties of light transmitting through the liquid crystal cell of an optical element according to an embodiment of the present invention.

FIG. 3B shows the liquid crystal cell 100 of FIG. 3A in a state where voltages are applied to the transparent electrodes 120. For example, high voltages (H) are applied to the first transparent electrode 120-1 and the third transparent electrode 120-3, and low voltages (L) are applied to the second transparent electrode 120-2 and the fourth transparent electrode 120-4. That is, voltages are applied so that a potential difference is generated between two adjacent transparent electrodes 120. In addition, hereinafter, the electric field generated between two adjacent transparent electrodes 120 may be referred to as a lateral electric field.

The liquid crystal molecules closer to the first substrate 110-1 are aligned in a convex arc shape in the x-axis direction with respect to the first substrate 110-1 by the influence of the lateral electric field between the first transparent electrode 120-1 and the second transparent electrode 120-2. Further, the liquid crystal molecules closer to the second substrate 110-2 are aligned in a convex arc shape in the y-axis direction with respect to the second substrate 110-2 by the influence of the lateral electric field between the third transparent electrode 120-3 and the fourth transparent electrode 120-4. At this time, the alignment direction of the liquid crystal molecules in the center between the first substrate 110-1 and the second substrate 110-2 (the liquid crystal molecules located near the top of the liquid crystal molecules in the above-mentioned convex arc shape) are hardly changed due to any lateral electric field. In addition, since the first substrate 110-1 and the second substrate 110-2 are far apart with a sufficient inter-substrate distance, the lateral electric field between the first transparent electrode 120-1 and the second transparent electrode 120-2 of the first substrate 110-1 does not affect the alignment of the liquid crystal molecules on the side of the second substrate 110-2, or is negligibly small. Similarly, the lateral electric field between the third transparent electrode 120-3 and the fourth transparent electrode 120-4 of the second substrate 110-2 does not affect the alignment of the liquid crystal molecules on the side of the first substrate 110-1, or is negligibly small. Therefore, the liquid crystal molecules in the twisted state before the generation of the lateral electric field maintain the twisted state even after the generation of the lateral electric field as shown in FIG. 3B, and the liquid crystal layer 150 has a refractive index distribution. In this case, the light transmitting through the liquid crystal layer 150 has optical rotation while diffusing the polarization component in the direction parallel to the alignment directions of the liquid crystal molecules.

Further, the case in which the light transmits through the liquid crystal cell 100 shown in FIG. 3B is described in detail. The light emitted from the light source has a polarization component in the x-axis direction (hereinafter, referred to as "P-polarization component") and a polarization component in the y-axis direction (hereinafter, referred to as "S-polarization component"). However, for convenience, the polarization component of the light is divided into the P-polarization component and the S-polarization component in the following description. That is, the light emitted from the light source includes a first polarized light 1000-1 having the P-polarization component and a second polarized light 1000-2 having the S-polarization component (see (1) in FIG. 3B).

In FIG. 3B, since the P-polarization component of the first polarized light 1000-1 incident on the liquid crystal cell 100 is the same as the alignment direction of the liquid crystal molecules on the side of the first substrate 110-1, the first polarized light 1000-1 is diffused in the x-axis direction according to the refractive index distribution of the liquid crystal molecules (see (2) in FIG. 3B). When the first polarized light 1000-1 travels from the first substrate 110-1 to the second substrate 110-2, the first polarized light 1000-1 undergoes optical rotation, and the polarized light component changes from the P-polarization component to the S-polarization component. Since the S-polarization component of the first polarized light 1000-1 is the same as the alignment direction of the liquid crystal molecules on the side of the second substrate 110-2, the first polarized light 1000-1 is diffused in the y-axis direction according to the refractive index distribution of the liquid crystal molecules (see (3) in FIG. 3B). Further, the first polarized light 1000-1 emitted from the liquid crystal cell 100 has the S-polarization component (see (4) in FIG. 3B).

In contrast, since the S-polarization component of the second polarized light 1000-2 incident on the liquid crystal cell 100 is different from the alignment direction of the liquid crystal molecules on the side of the first substrate 110-1, the second polarized light 1000-2 is not diffused (See (2) in FIG. 3B). When the second polarized light 1000-2 travels from the first substrate 110-1 to the second substrate 110-2, the second polarized light 1000-2 undergoes optical rotation, and the polarization component changes from the S-polarization component to the P-polarization component. Since the second polarized light 1000-2 having the P-polarization component is different from the alignment direction of the liquid crystal molecules on the side of the second substrate 110-2, the second polarized light 1000-2 is not diffused (see (3) in FIG. 3B). Further, the second polarized light 1000-2 emitted from the liquid crystal cell 100 has the P-polarization component (see (4) in FIG. 3B).

Next, a configuration of an alignment of the liquid crystal molecules different from the above-mentioned alignment is described.

Figure 3C:
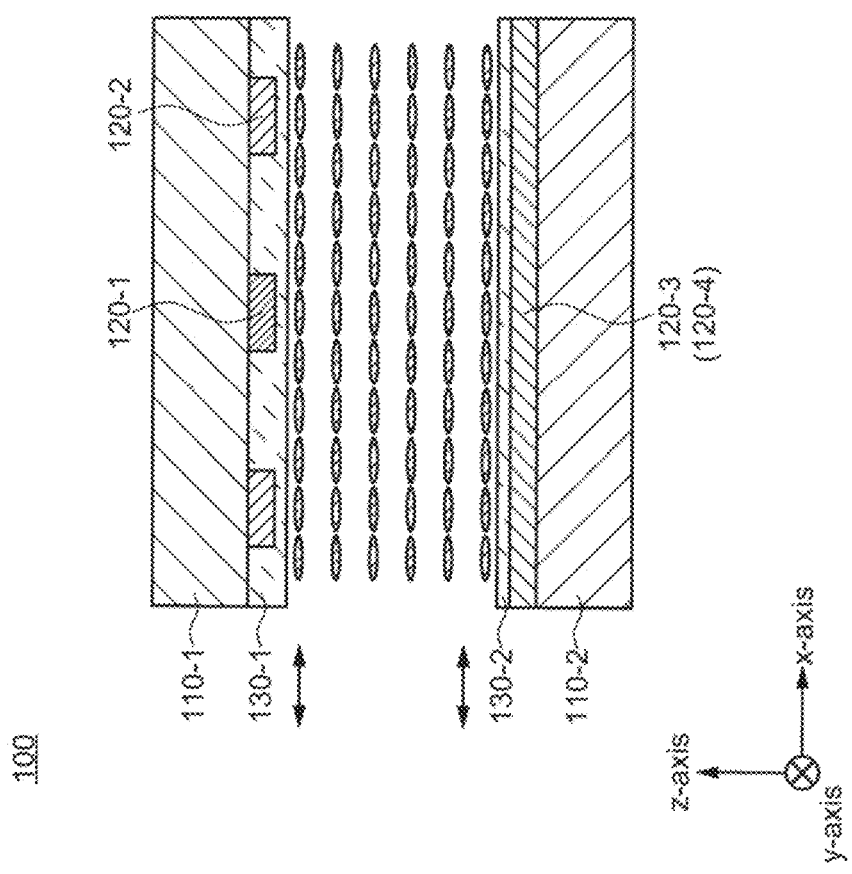
FIG. 3C is a schematic cross-sectional view illustrating alignment directions of liquid crystal molecules in a liquid crystal layer of a liquid crystal cell and properties of light transmitting through the liquid crystal cell of an optical element according to an embodiment of the present invention.

FIG. 3C shows the liquid crystal cell 100 in which no voltages are applied to the transparent electrodes 120. As the above-described, the rubbing treatment is performed on the first alignment film 130-1 in the x-axis direction. On the other hand, unlike the above-described treatment, the rubbing treatment is performed on the second alignment film 130-2 in the x-axis direction. Therefore, the long axes of the liquid crystal molecules on the second alignment film 130-2 are aligned along the x-axis direction. In other words, the alignment directions of the liquid crystal molecules closer to the second substrate 110-2 are the x-axis direction. In this way, when the initial alignment directions of the liquid crystal molecules do not intersect between the substrates 110 of the liquid crystal cell 100 (or the alignment direction of the first alignment film 130-1 and the alignment direction of the second alignment film 130-2 do not intersect), the liquid crystal molecules in the liquid crystal layer 150 are not changed to smoothly align from the first substrate 110-1 to the second substrate 110-2 as shown in FIG. 3A. In addition, hereinafter, when the liquid crystal layer 150 is in the above state, it is said that the liquid crystal layer 150 is not in a twisted state. In this case, the polarization component of the light transmitting through the liquid crystal layer 150 is not rotated. In other words, the light transmitting through the liquid crystal layer 150 does not have optical rotation.

Figure 3D:
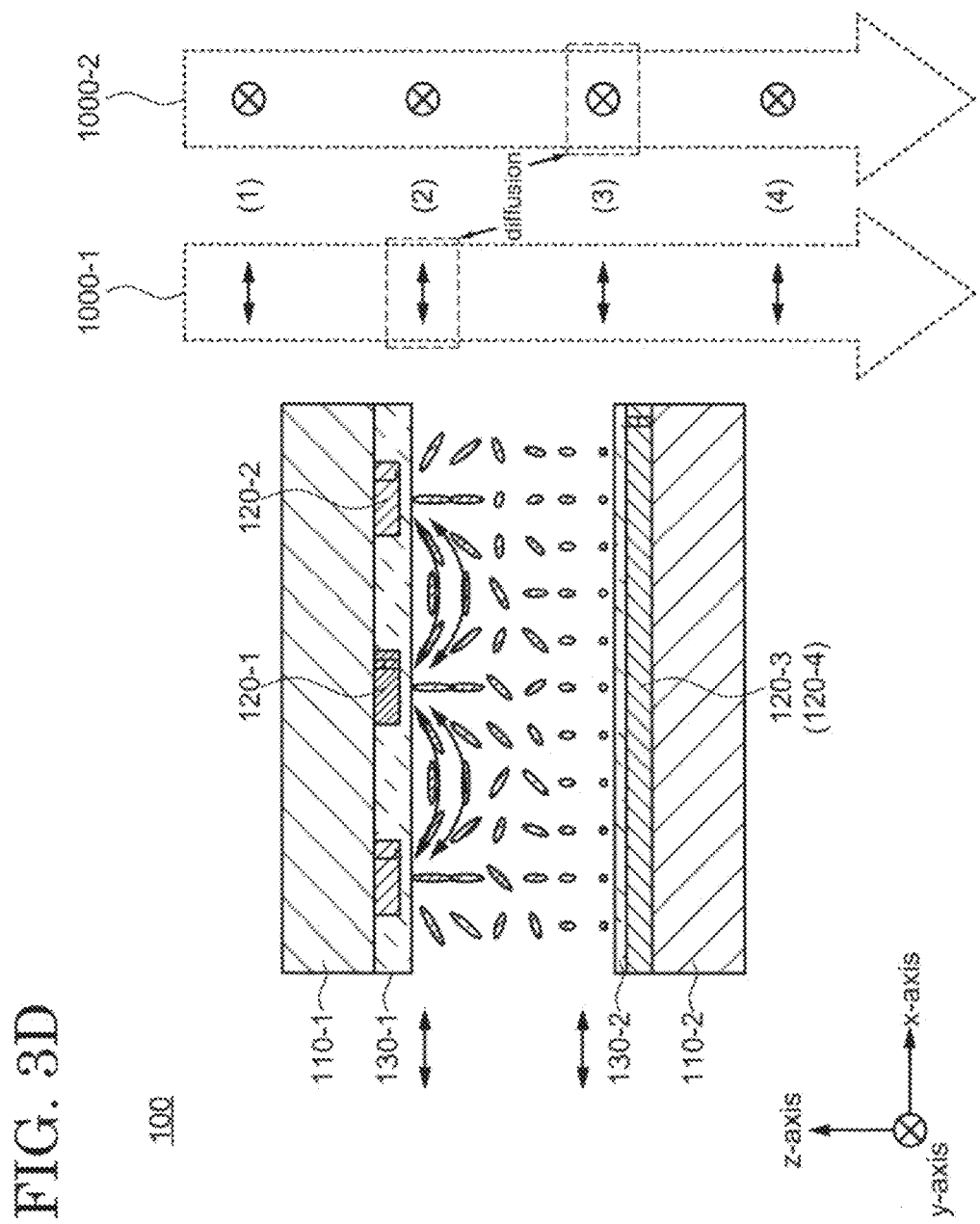
FIG. 3D is a schematic cross-sectional view illustrating alignment directions of liquid crystal molecules in a liquid crystal layer of a liquid crystal cell and properties of light transmitting through the liquid crystal cell of an optical element according to an embodiment of the present invention.

FIG. 3D shows the liquid crystal cell 100 of FIG. 3C in a state where voltages are applied to the transparent electrodes 120. The liquid crystal molecules closer to the first substrate 110-1 are aligned in a convex arc shape in the x-axis direction with respect to the first substrate 110-1 by the influence of the lateral electric field between the first transparent electrode 120-1 and the second transparent electrode 120-2. On the other hand, the liquid crystal molecules closer to the second substrate 110-2 rotate so as to change their long axes in the y-axis direction and are aligned in a convex arc shape in the y-axis direction with respect to the second substrate 110-2 by the influence of the lateral electric field between the third transparent electrode 120-3 and the fourth transparent electrode 120-4. At this time, since the liquid crystal molecules in the center between the first substrate 110-1 and the second substrate 110-2 are far away with a sufficient inter-substrate distance, the alignment of the liquid crystal molecules are hardly changed due to any lateral electric field on the side of the first substrate 110-2 or on the side of the second substrate 110-2. Therefore, in the liquid crystal cell 100 shown in FIG. 3D, even when the liquid crystal molecules closer to the first substrate 110-1 and the liquid crystal molecules closer to the second substrate 110-2 are aligned in the x-axis direction and the y-axis direction, respectively, the liquid crystal molecules in the liquid crystal layer 150 do not rotate little by little continuously from the first substrate 110-2 to the second substrate 110-2. In this case, optically, the alignment state is only changed separately on the side of each substrate 110. Therefore, the liquid crystal molecules not in the twisted state before the generation of the lateral electric field maintain their not twisted state even after the generation of the lateral electric field as shown in FIG. 3D, and the liquid crystal layer 150 has a refractive index distribution. In this way, when the alignment directions of the liquid crystal molecules are discontinuously changed when viewed from the thickness direction of the liquid crystal layer 150, the light transmitting through the liquid crystal layer 150 does not have optical rotation while diffusing the polarization component in the direction parallel to the alignment directions of the liquid crystal molecules.

Further, the case in which the light transmits through the liquid crystal cell 100 shown in FIG. 3D is described in detail. In FIG. 3D, since the P-polarization component of the first polarized light 1000-1 incident on the liquid crystal cell 100 is the same as the alignment direction of the liquid crystal molecules on the side of the first substrate 110-1, the first polarized light 1000-1 is diffused in the x-axis direction according to the refractive index distribution of the liquid crystal molecules (see (2) in FIG. 3D). Since the first polarized light 1000-1 traveling from the first substrate 110-1 to the second substrate 110-2 does not undergo optical rotation, the first polarized light 1000-1 maintains the P-polarization component. Since the P-polarization component of the first polarized light 1000-1 is different from the alignment direction of the liquid crystal molecules on the side of the second substrate 110-2, the first polarized light 1000-1 is not diffused (see (3) in FIG. 3D). Further, the first polarized light 1000-1 emitted from the liquid crystal cell 100 has the P polarized light component (see (4) in FIG. 3D).

In contrast, since the S-polarization component of the second polarized light 1000-2 incident on the liquid crystal cell 100 is different from the alignment direction of the liquid crystal molecules on the side of the first substrate 110-1, the second polarized light 1000-2 is not diffused (See (2) in FIG. 3D). When the second polarized light 1000-2 traveling from the first substrate 110-1 to the second substrate 110-2 does not undergo optical rotation, the second polarized light 1000-2 maintains the S-polarization component. Since the second polarized light 1000-2 having the S-polarization component is the same as the alignment direction of the liquid crystal molecules on the side of the second substrate 110-2, the second polarized light 1000-2 is diffused in the y-axis direction according to the refractive index distribution of the liquid crystal molecules (see (3) in FIG. 3D). Further, the second polarized light 1000-2 emitted from the liquid crystal cell 100 has the S-polarization component (see (4) in FIG. 3D).

As can be seen from the above, in the liquid crystal cell 100, the alignment of the liquid crystal molecules in the liquid crystal layer 150 can be controlled by the extending direction of the transparent electrode 120, the rubbing direction of the alignment film 130, and the voltages applied to the transparent electrodes 120. Therefore, the optical element 10 can diffuse light in a predetermined direction by using the optical rotation and refractive index distribution of liquid crystal molecules of each of the plurality of liquid crystal cells 100.

Next, the extending directions of the transparent electrodes 120 and the alignment directions of the liquid crystal molecules in the liquid crystal layer 150 in the optical element 10 are described.

Figure 4:
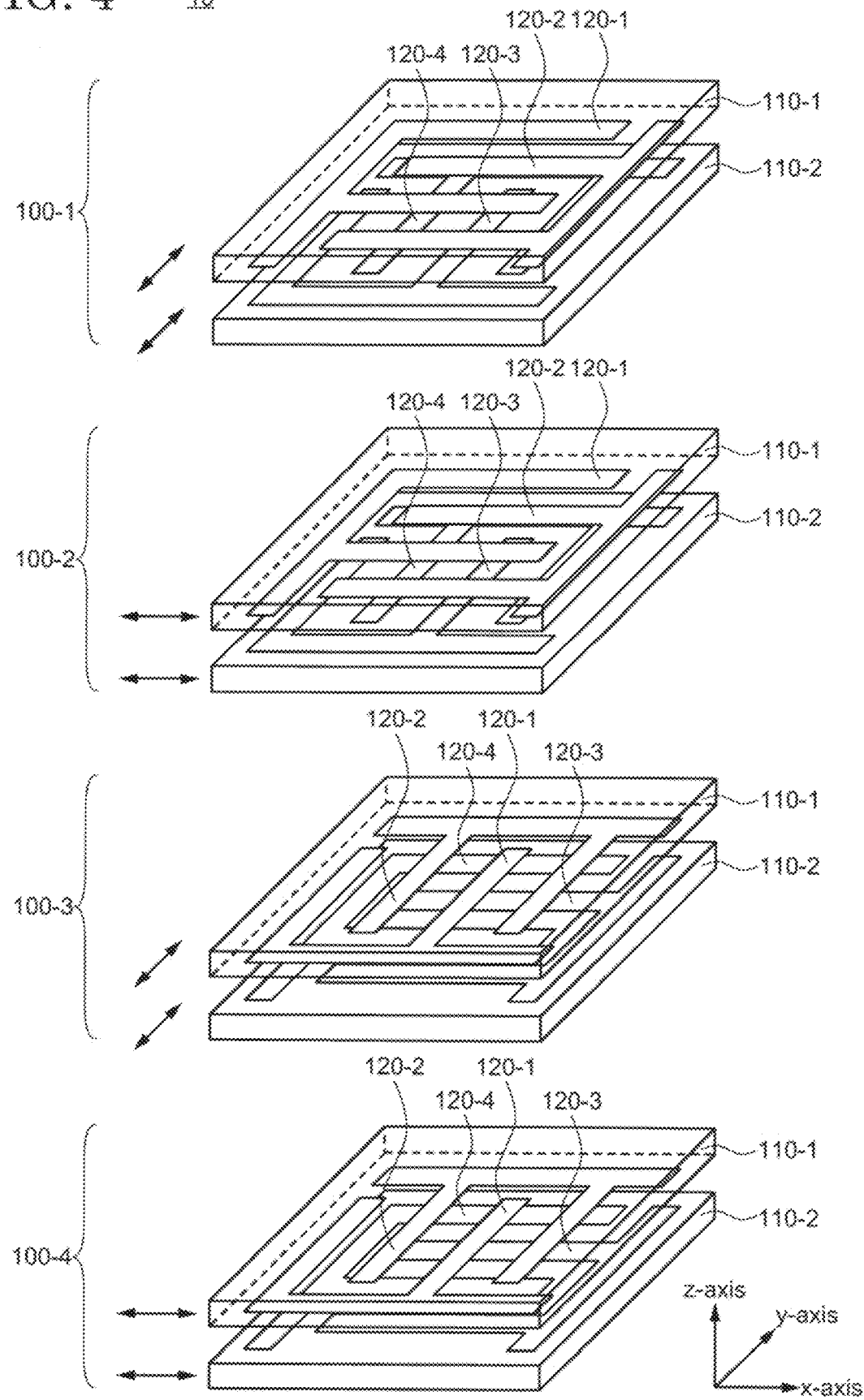
FIG. 4 is a schematic diagram illustrating a relationship between extending directions of transparent electrodes and alignment directions of liquid crystal molecules on the transparent electrodes in a state where no voltages are applied to the transparent electrode of an optical element according to an embodiment of the present invention.

FIG. 4 is a schematic diagram illustrating a relationship between the extending direction of the transparent electrodes 120 and the alignment directions of the liquid crystal molecules on the transparent electrodes 120 in a state where no voltages are applied to the transparent electrode 120 of the optical element 10 according to an embodiment of the present invention. Arrows in FIG. 4 indicate alignment directions of the liquid crystal molecules closer to each substrate 110. Table 1 shows each parameter of the optical element 10 shown in FIG. 4.

TABLE 1

| | | extending direction of transparent electrode | initial alignment direction of liquid crystal molecules |
|---|---|---|---|
| first liquid crystal cell | first substrate side | x-axis direction | y-axis direction |
| | second substrate side | y-axis direction | y-axis direction |
| second liquid crystal cell | first substrate side | x-axis direction | x-axis direction |
| | second substrate side | y-axis direction | x-axis direction |
| third liquid crystal cell | first substrate side | y-axis direction | y-axis direction |
| | second substrate side | x-axis direction | y-axis direction |
| fourth liquid crystal cell | first substrate side | y-axis direction | x-axis direction |
| | second substrate side | x-axis direction | x-axis direction |

In order to obtain a light distribution having a cross shape by the optical element 10, in each of the first liquid crystal cell 100-1, the second liquid crystal cell 100-2, the third liquid crystal cell 100-3, and the fourth liquid crystal cell 100-4, high voltages are applied to the first transparent electrode 120-1 and the third transparent electrode 120-3, and low voltages are applied to the second transparent electrode 120-2 and the fourth transparent electrode 120-4.

In the first liquid crystal cell 100-1, when voltages are applied to the transparent electrodes 120 as described above, the liquid crystal molecules closer to the first substrate 110-1 are aligned in a convex arc shape in the y-axis direction, and the liquid crystal molecules closer to the second substrate 110-2 rotate from the y-axis direction to the x-axis direction to be aligned in a convex arc shape in the x-axis direction. Since the liquid crystal molecules in the first liquid crystal cell 100-1 are not in a twisted state, the liquid crystal layer 150 does not have optical rotation. In the second liquid crystal cell 100-2, the liquid crystal molecules closer to the first substrate 110-1 rotate from the x-axis direction to the y-axis direction to be aligned in a convex arc shape in the y-axis direction, and the liquid crystal molecules closer to the second substrate 110-2 are aligned in a convex arc shape in the x-axis direction. Since the liquid crystal molecules in the second liquid crystal cell 100-2 are not in a twisted state, the liquid crystal layer 150 does not have optical rotation. In the third liquid crystal cell 100-3, the liquid crystal molecules closer to the first substrate 110-1 rotate from the y-axis direction to the x-axis direction to be aligned in a convex arc shape in the x-axis direction, and the liquid crystal molecules closer to the second substrate 110-2 are aligned in a convex arc shape in the y-axis direction. Since the liquid crystal molecules in the third liquid crystal cell 100-3 are not in a twisted state, the liquid crystal layer 150 does not have optical rotation. In the fourth liquid crystal cell 100-4, the liquid crystal molecules closer to the first substrate 110-1 are aligned in a convex arc shape in the x-axis direction, and the liquid crystal molecules closer to the second substrate 110-2 rotate from the x-axis direction to the y-axis direction to be aligned in a convex arc shape in the y-axis direction. Since the liquid crystal molecules in the fourth liquid crystal cell 100-4 are not in a twisted state, the liquid crystal layer 150 does not have optical rotation. Therefore, when light transmits through the optical element 10, the P-polarization component and the S-polarization component of the light at the time of incidence on the optical element 10 are controlled as shown in Table 2.

TABLE 2

| | | P-polarization component | S-polarization component |
|---|---|---|---|
| first liquid crystal cell | first substrate side | — | diffusion in the y-axis direction |
| | second substrate side | diffusion in the x-axis direction | — |
| second liquid crystal cell | first substrate side | — | diffusion in the y-axis direction |
| | second substrate side | diffusion in the x-axis direction | — |
| third liquid crystal cell | first substrate side | diffusion in the x-axis direction | — |
| | second substrate side | — | diffusion in the y-axis direction |
| fourth liquid crystal cell | first substrate side | diffusion in the x-axis direction | — |
| | second substrate side | — | diffusion in the y-axis direction |

As can be seen from Table 2, in the optical element 10, the P-polarization component of the incident light is diffused four times in the x-axis direction, and the S-polarized light component is diffused four times in the y-axis direction. Further, in the optical element 10, both the P-polarization component and the S-polarization component are diffused not only on the side of the first substrate 110-1 but also on the side of the second substrate 110-2.

As described above, in the optical element 10 according to an embodiment of the present invention, a light distribution having a cross shape can be obtained by increasing the number of times of diffusion compared to the conventional optical element. Therefore, color unevenness in the light distribution having a cross shape can be suppressed. Further, since the number of times of diffusion can be increased without increasing the number of liquid crystal cells 100 in the optical element 10, a decrease in transmittance and an increase in manufacturing cost can be suppressed.

Second Embodiment

An optical element 20 according to an embodiment of the present invention is described with reference to FIG. 5. In the description, when a configuration of the optical element 20 is similar to the configuration of the optical element 10, the description of the configuration of the optical element 20 may be omitted.

Figure 5:
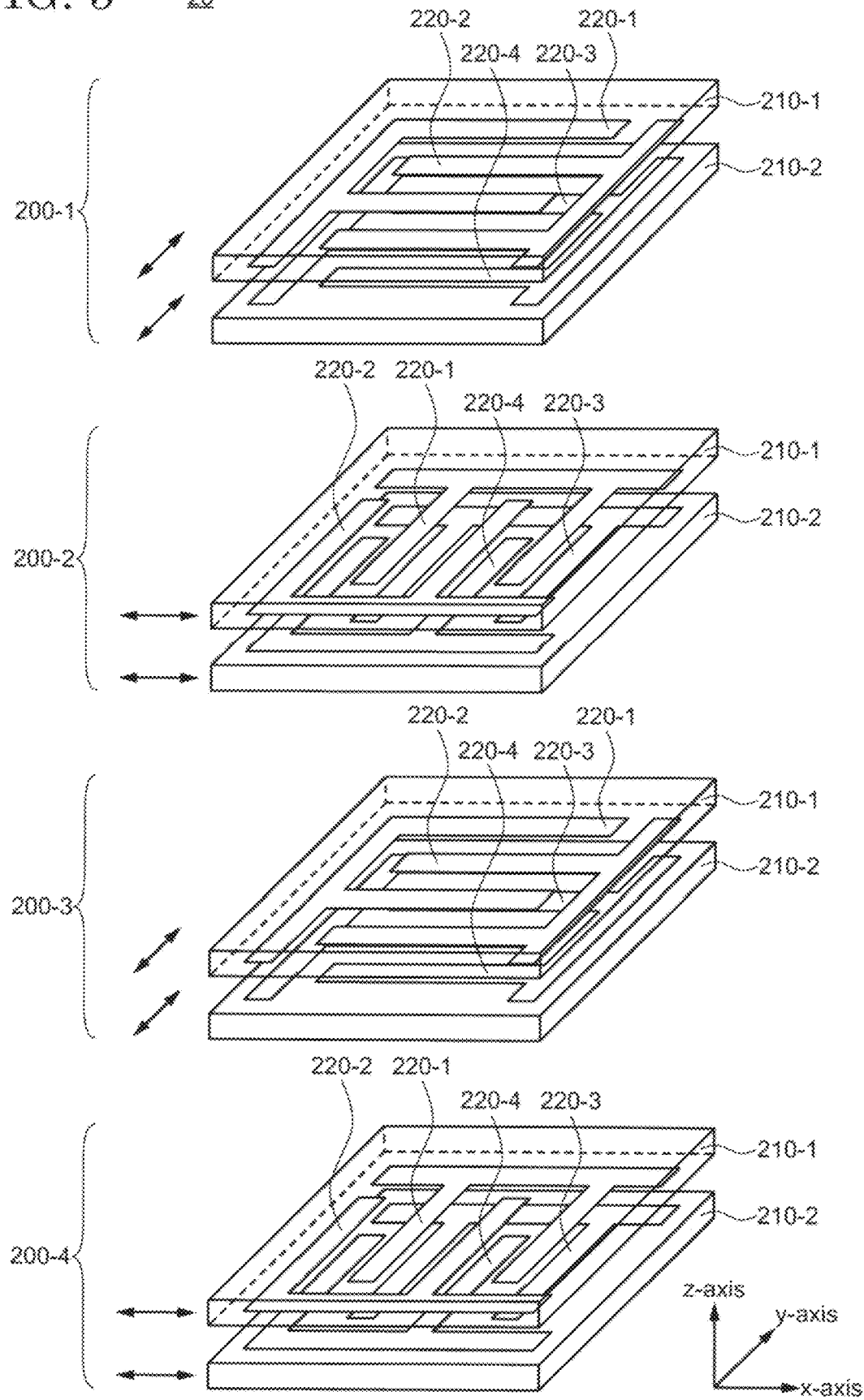
FIG. 5 is a schematic diagram illustrating a relationship between extending directions of transparent electrodes and alignment directions of liquid crystal molecules on the transparent electrodes in a state where no voltages are applied to the transparent electrode of an optical element according to an embodiment of the present invention.

FIG. 5 is a schematic diagram illustrating a relationship between extending directions of transparent electrodes 220 and alignment directions of liquid crystal molecules on the transparent electrodes 220 in a state where no voltages are applied to the transparent electrode 220 of the optical element 20 according to an embodiment of the present invention. In each of a first liquid crystal cell 200-1, a second liquid crystal cell 200-2, a third liquid crystal cell 200-3, and a fourth liquid crystal cell 200-4 of the optical element 20, a first transparent electrode 220-1 and a second transparent electrode 220-2 are provided on a first substrate 210-1 and a third transparent electrode 220-3 and a fourth transparent electrode 220-4 are provided on the second substrate 210-2. Arrows in FIG. 5 indicate the alignment directions (the initial alignment directions) of the liquid crystal molecules closer to each substrate 210. Table 3 shows each parameter of the optical element 20 shown in FIG. 5.

TABLE 3

| | | extending direction of transparent electrode | initial alignment direction of liquid crystal molecules |
|---|---|---|---|
| first liquid crystal cell | first substrate side | x-axis direction | y-axis direction |
| | second substrate side | x-axis direction | y-axis direction |
| second liquid crystal cell | first substrate side | y-axis direction | x-axis direction |
| | second substrate side | y-axis direction | x-axis direction |
| third liquid crystal cell | first substrate side | x-axis direction | y-axis direction |
| | second substrate side | x-axis direction | y-axis direction |
| fourth liquid crystal cell | first substrate side | y-axis direction | x-axis direction |
| | second substrate side | y-axis direction | x-axis direction |

As can be seen from Table 3, the third liquid crystal cell 200-3 and the fourth liquid crystal cell 200-4 have the same structure as the first liquid crystal cell 200-1 and the second liquid crystal cell 200-2, respectively. In other words, the optical element 20 has a structure in which the first liquid crystal cells 200-1 and the second liquid crystal cell 200-2 are alternately stacked.

In order to obtain a light distribution having a cross shape by the optical element 20, in each of the first liquid crystal cell 200-1, the second liquid crystal cell 200-2, the third liquid crystal cell 200-3, and the fourth liquid crystal cell 200-4, high voltages are applied to the first transparent electrode 220-1 and the third transparent electrode 220-3, and low voltages are applied to the second transparent electrode 220-2 and the fourth transparent electrode 220-4.

In the first liquid crystal cell 200-1, when voltages are applied to the transparent electrodes 220 as described above, the liquid crystal molecules closer to each of the first substrate 210-1 and the second substrate 210-2 are aligned in a convex arc shape in the y-axis direction. Since the liquid crystal molecules in the first liquid crystal cell 200-1 are not in a twisted state, the liquid crystal layer does not have optical rotation. In the second liquid crystal cell 200-2, the liquid crystal molecules closer to each of the first substrate 210-1 and the second substrate 210-2 are aligned in a convex arc shape in the x-axis direction.

Since the liquid crystal molecules in the second liquid crystal cell 200-2 are not in a twisted state, the liquid crystal layer does not have optical rotation. The third liquid crystal cell 200-3 and the fourth liquid crystal cell 200-4 have the same configuration as the first liquid crystal cell 200-1 and the second liquid crystal cell 200-2, respectively. Therefore, when light transmits through the optical element 20, the P-polarization component and the S-polarization component of the light at the time of incidence on the optical element 20 are controlled as shown in Table 4.

TABLE 4

| | | P-polarization component | S-polarization component |
|---|---|---|---|
| first liquid crystal cell | first substrate side | — | diffusion in the y-axis direction |
| | second substrate side | — | diffusion in the y-axis direction |
| second liquid crystal cell | first substrate side | diffusion in the x-axis direction | — |
| | second substrate side | diffusion in the x-axis direction | — |
| third liquid crystal cell | first substrate side | — | diffusion in the y-axis direction |
| | second substrate side | — | diffusion in the y-axis direction |
| fourth liquid crystal cell | first substrate side | diffusion in the x-axis direction | — |
| | second substrate side | diffusion in the x-axis direction | — |

As can be seen from Table 4, in the optical element 20, the P-polarization component of the incident light is diffused four times in the x-axis direction, and the S-polarized light component is diffused four times in the y-axis direction. Further, in the optical element 20, both the P-polarization component and the S-polarization component are diffused not only on the side of the first substrate 210-1 but also on the side of the second substrate 210-2.

As described above, in the optical element 20 according to an embodiment of the present invention, a light distribution having a cross shape can be obtained by increasing the number of times of diffusion compared to the conventional optical element. Therefore, color unevenness in the light distribution having a cross shape can be suppressed. Further, since the number of times of diffusion can be increased without increasing the number of liquid crystal cells 200 in the optical element 20, a decrease in transmittance and an increase in manufacturing cost can be suppressed.

Third Embodiment

An optical element 30 according to an embodiment of the present invention is described with reference to FIG. 6. In the description, when a configuration of the optical element 30 is similar to the configuration of the optical element 10 or the optical element 20, the description of the configuration of the optical element 30 may be omitted.

Figure 6:
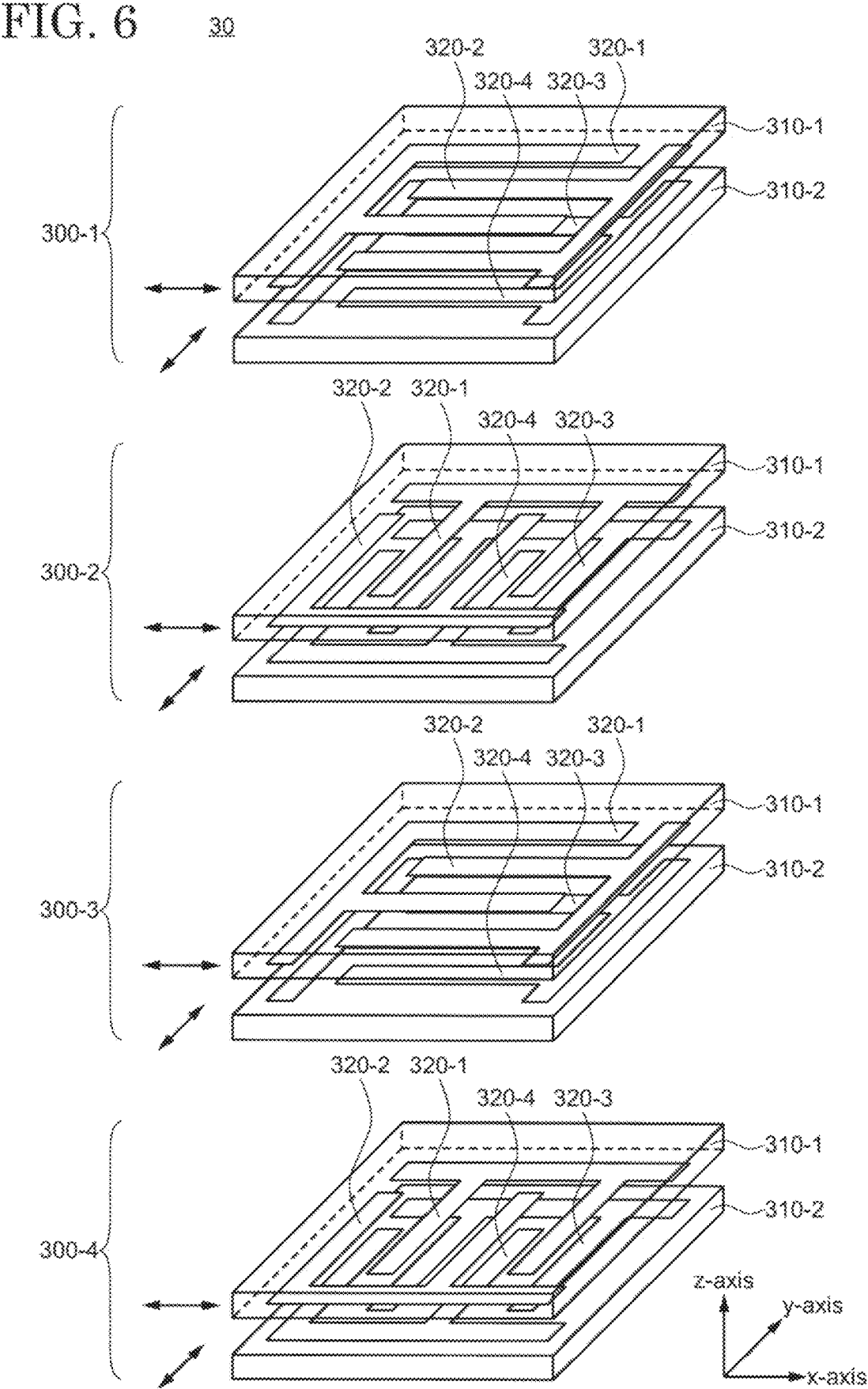
FIG. 6 is a schematic diagram illustrating a relationship between extending directions of transparent electrodes and alignment directions of liquid crystal molecules on the transparent electrodes in a state where no voltages are applied to the transparent electrode of an optical element according to an embodiment of the present invention.

FIG. 6 is a schematic diagram illustrating a relationship between extending directions of transparent electrodes 320 and alignment directions of liquid crystal molecules on the transparent electrodes 320 in a state where no voltages are applied to the transparent electrode 320 of the optical element 30 according to an embodiment of the present invention. In each of a first liquid crystal cell 300-1, a second liquid crystal cell 300-2, a third liquid crystal cell 300-3, and a fourth liquid crystal cell 300-4 of the optical element 30, a first transparent electrode 320-1 and a second transparent electrode 320-2 are provided on a first substrate 310-1 and a third transparent electrode 320-3 and a fourth transparent electrode 320-4 are provided on the second substrate 310-2. Arrows in FIG. 6 indicate the alignment directions (the initial alignment directions) of the liquid crystal molecules closer to each substrate 310. Table 6 shows each parameter of the optical element 30 shown in FIG. 6.

TABLE 5

| | | extending direction of transparent electrode | initial alignment direction of liquid crystal molecules |
|---|---|---|---|
| first liquid crystal cell | first substrate side | x-axis direction | x-axis direction |
| | second substrate side | x-axis direction | y-axis direction |
| second liquid crystal cell | first substrate side | y-axis direction | x-axis direction |
| | second substrate side | y-axis direction | y-axis direction |
| third liquid crystal cell | first substrate side | x-axis direction | x-axis direction |
| | second substrate side | x-axis direction | y-axis direction |
| fourth liquid crystal cell | first substrate side | y-axis direction | x-axis direction |
| | second substrate side | y-axis direction | y-axis direction |

As can be seen from Table 5, the third liquid crystal cell 300-3 and the fourth liquid crystal cell 300-4 have the same structure as the first liquid crystal cell 300-1 and the second liquid crystal cell 300-2, respectively. In other words, the optical element 30 has a structure in which the first liquid crystal cells 300-1 and the second liquid crystal cell 300-2 are alternately stacked.

In order to obtain a light distribution having a cross shape by the optical element 30, in each of the first liquid crystal cell 300-1, the second liquid crystal cell 300-2, the third liquid crystal cell 300-3, and the fourth liquid crystal cell 300-4, high voltages are applied to the first transparent electrode 320-1 and the third transparent electrode 320-3, and low voltages are applied to the second transparent electrode 320-2 and the fourth transparent electrode 320-4.

In the first liquid crystal cell 300-1, when voltages are applied to the transparent electrodes 320 as described above, the liquid crystal molecules closer to the first substrate 310-1 rotate from the x-axis direction to the y-axis direction to be aligned in a convex arc shape in the y-axis direction, and the liquid crystal molecules closer to the second substrate 310-2 are aligned in a convex arc shape in the y-axis direction. Since the liquid crystal molecules in the first liquid crystal cell 300-1 are not in a twisted state, the liquid crystal layer does not have optical rotation. In the second liquid crystal cell 300-2, the liquid crystal molecules closer to the first substrate 310-1 are aligned in a convex arc shape in the x-axis direction, and the liquid crystal molecules closer to the second substrate 310-2 rotate from the y-axis direction to the x-axis direction to be aligned in a convex arc shape in the x-axis direction. Since the liquid crystal molecules in the second liquid crystal cell 300-2 are not in a twisted state, the liquid crystal layer does not have optical rotation. The third liquid crystal cell 300-3 and the fourth liquid crystal cell 300-4 have the same configuration as the first liquid crystal cell 300-1 and the second liquid crystal cell 300-2, respectively. Therefore, when light transmits through the optical element 30, the P-polarization component and the S-polarization component of the light at the time of incidence on the optical element 30 are controlled as shown in Table 6.

TABLE 6

| | | P-polarization component | S-polarization component |
|---|---|---|---|
| first liquid crystal cell | first substrate side | — | diffusion in the y-axis direction |
| | second substrate side | — | diffusion in the y-axis direction |
| second liquid crystal cell | first substrate side | diffusion in the x-axis direction | — |
| | second substrate side | diffusion in the x-axis direction | — |
| third liquid crystal cell | first substrate side | — | diffusion in the y-axis direction |
| | second substrate side | — | diffusion in the y-axis direction |
| fourth liquid crystal cell | first substrate side | diffusion in the x-axis direction | — |
| | second substrate side | diffusion in the x-axis direction | — |

As can be seen from Table 6, in the optical element 30, the P-polarization component of the incident light is diffused four times in the x-axis direction, and the S-polarized light component is diffused four times in the y-axis direction. Further, in the optical element 30, both the P-polarization component and the S-polarization component are diffused not only on the side of the first substrate 310-1 but also on the side of the second substrate 310-2.

As described above, in the optical element 30 according to an embodiment of the present invention, a light distribution having a cross shape can be obtained by increasing the number of times of diffusion compared to the conventional optical element. Therefore, color unevenness in the light distribution having a cross shape can be suppressed. Further, since the number of times of diffusion can be increased without increasing the number of liquid crystal cells 300 in the optical element 30, a decrease in transmittance and an increase in manufacturing cost can be suppressed.

Modification 1 of Third Embodiment

A shape of the light distribution obtained by the optical element 30 is not limited to the cross shape. When voltages applied to the transparent electrodes 320 are controlled, various shapes of the light distribution can be obtained. For example, in each of the first liquid crystal cell 300-1 and the second liquid crystal cell 300-2, high voltages are applied to the first transparent electrode 320-1 and the third transparent electrode 320-3, and low voltages are applied to the second transparent electrode 320-2 and the fourth transparent electrode 320-4. Further, in the third liquid crystal cell 300-3, no voltages are applied to the first transparent electrode 320-1 and the second transparent electrode 320-2, and a high voltage and a low voltage are applied to the third transparent electrode 320-3 and the fourth transparent electrode 320-4, respectively. Furthermore, in the fourth liquid crystal cell 300-4, a high voltage and a low voltage are applied to the first transparent electrode 320-1 and the second transparent electrode 320-2, respectively, and no voltages are applied to the third transparent electrode 320-3 and the fourth transparent electrode 320-4.

In the first liquid crystal cell 300-1, when voltages are applied to the transparent electrodes 320 as described above, the liquid crystal molecules closer to the first substrate 310-1 rotate from the x-direction to the y-axis direction so as to be aligned in a convex arc shape in the y-axis direction, and the liquid crystal molecules closer to the second substrate 310-2 are aligned in a convex arc shape in the y-axis direction. Since the liquid crystal molecules in the first liquid crystal cell 300-1 are not in a twisted state, the liquid crystal layer does not have optical rotation. In the second liquid crystal cell 300-2, the liquid crystal molecules closer to the first substrate 310-1 are aligned in a convex arc shape in the x-axis direction, and the liquid crystal molecules closer to the second substrate 310-2 rotate from the y-axis direction to the x-axis direction so as to be aligned in a convex arc shape in the x-axis direction. Since the liquid crystal molecules in the second liquid crystal cell 300-2 are not in a twisted state, the liquid crystal layer does not have optical rotation. In the third liquid crystal cell 300-3, the liquid crystal molecules closer to the first substrate 310-1 are aligned in the x-direction, and the liquid crystal molecules closer to the second substrate 310-2 are aligned in a convex arc shape in the y-direction. Since the liquid crystal molecules in the third liquid crystal cell 300-3 are in a twisted state, the liquid crystal layer has optical rotation. In the fourth liquid crystal cell 300-4, the liquid crystal molecules closer to the first substrate 310-1 are aligned in a convex arc in the y-axis direction, and the liquid crystal molecules closer to the second substrate 310-2 are aligned in the x-axis direction. Since the liquid crystal molecules in the fourth liquid crystal cell 300-4 are in a twisted state, the liquid crystal layer has optical rotation. Therefore, when light transmits through the optical element 30, the P-polarization component and the S-polarization component of the light at the time of incidence on the optical element 30 are controlled as shown in Table 7.

y-axis direction, and the number of times of the diffusion each in the x-axis direction and the y-axis direction is the same, so that a light distribution having a circular shape is obtained.

Modification 2 of Third Embodiment

A shape of the light distribution obtained by the optical element 30 is not limited to the circular shape. For example, in the first liquid crystal cell 300-1 and the third liquid crystal cell 300-3, no voltages are applied to the first transparent electrode 320-1 and the second transparent electrode 320-2, and a high voltage and a low voltage are applied to the third transparent electrode 320-3 and the fourth transparent electrode 320-4, respectively. In the second liquid crystal cell 300-2 and the fourth liquid crystal cell 300-4, high voltages are applied to the first transparent electrode 320-1 and the third transparent electrode 320-3, and low voltages are applied to the second transparent electrode 320-2 and the fourth transparent electrodes 320-4.

In the first liquid crystal cell 300-1, when voltages are applied to the transparent electrodes 320 as described above, the liquid crystal molecules closer to the first substrate 310-1 are aligned in the x-axis direction, and the liquid crystal molecules closer to the second substrate 310-2 are aligned in a convex arc shape in the y-axis direction. Since the liquid crystal molecules in the first liquid crystal cell 300-1 are in a twisted state, the liquid crystal layer has optical rotation. The third liquid crystal cell 300-3 and the fourth liquid crystal cell 300-4 have the same configuration as the first liquid crystal cell 300-1 and the second liquid crystal cell 300-2, respectively. Therefore, when light transmits through the optical element 30, the P-polarization component and the S-polarization component of the light at the time of incidence on the optical element 30 are controlled as shown in Table 8.

TABLE 7

| | | P-polarization component | S-polarization component |
|---|---|---|---|
| first liquid crystal cell | first substrate side | — | diffusion in the y-axis direction |
| | second substrate side | — | diffusion in the y-axis direction |
| second liquid crystal cell | first substrate side | diffusion in the x-axis direction | — |
| | second substrate side | diffusion in the x-axis direction | — |
| third liquid crystal cell | first substrate side | — | — |
| | second substrate side | diffusion in the y-axis direction | — |
| fourth liquid crystal cell | first substrate side | — | diffusion in the x-axis direction |
| | second substrate side | — | — |

TABLE 8

| | | P-polarization component | S-polarization component |
|---|---|---|---|
| first liquid crystal cell | first substrate side | diffusion in the y-axis direction | — |
| | second substrate side | — | diffusion in the x-axis direction |
| second liquid crystal cell | first substrate side | — | diffusion in the x-axis direction |
| | second substrate side | — | — |
| third liquid crystal cell | first substrate side | — | diffusion in the y-axis direction |
| | second substrate side | diffusion in the x-axis direction | — |
| fourth liquid crystal cell | first substrate side | diffusion in the x-axis direction | — |
| | second substrate side | diffusion in the y-axis direction | — |

As can be seen from Table 7, when voltages applied to the transparent electrodes 320 are controlled in the optical element 30, the P-polarization component of the incident light is diffused three times and the S-polarization component of the incident light is diffused three times. Specifically, the P-polarization is diffused twice and once in the x-axis direction and the y-axis direction, respectively. The S-polarization component is diffused once and twice in the x-axis direction and the y-axis direction, respectively. Both the P-polarization component and the S-polarization component are diffused not only in the x-axis direction but also in the As can be seen from Table 8, when voltages applied to the transparent electrodes 320 are controlled in the optical element 30, the P-polarization component of the incident light is diffused three times and the S-polarization component of the incident light is diffused three times. Specifically, the P-polarization is diffused twice and once in the x-axis direction and the y-axis direction, respectively. The S-polarization component is diffused twice and once in the x-axis direction and the y-axis direction, respectively. Both the P-polarization component and the S-polarization component are diffused not only in the x-axis direction but also in the y-axis direction, and the number of times of the diffusion in the x-axis direction is more than the number of times of the diffusion in the y-axis direction, so that a light distribution having an elliptical shape is obtained.

As described above in Modification 1 and Modification 2, not only the light distribution having a cross shape but also the light distribution having a circular shape or an elliptical shape can be obtained in the optical element 30 according to an embodiment of the present invention.

Fourth Embodiment

An optical element 40 according to an embodiment of the present invention is described with reference to FIG. 7. In the description, when a configuration of the optical element 40 is similar to the optical element 10, the optical element 20, or the optical element 30, the description of the configuration of the optical element 40 may be omitted.

Figure 7:
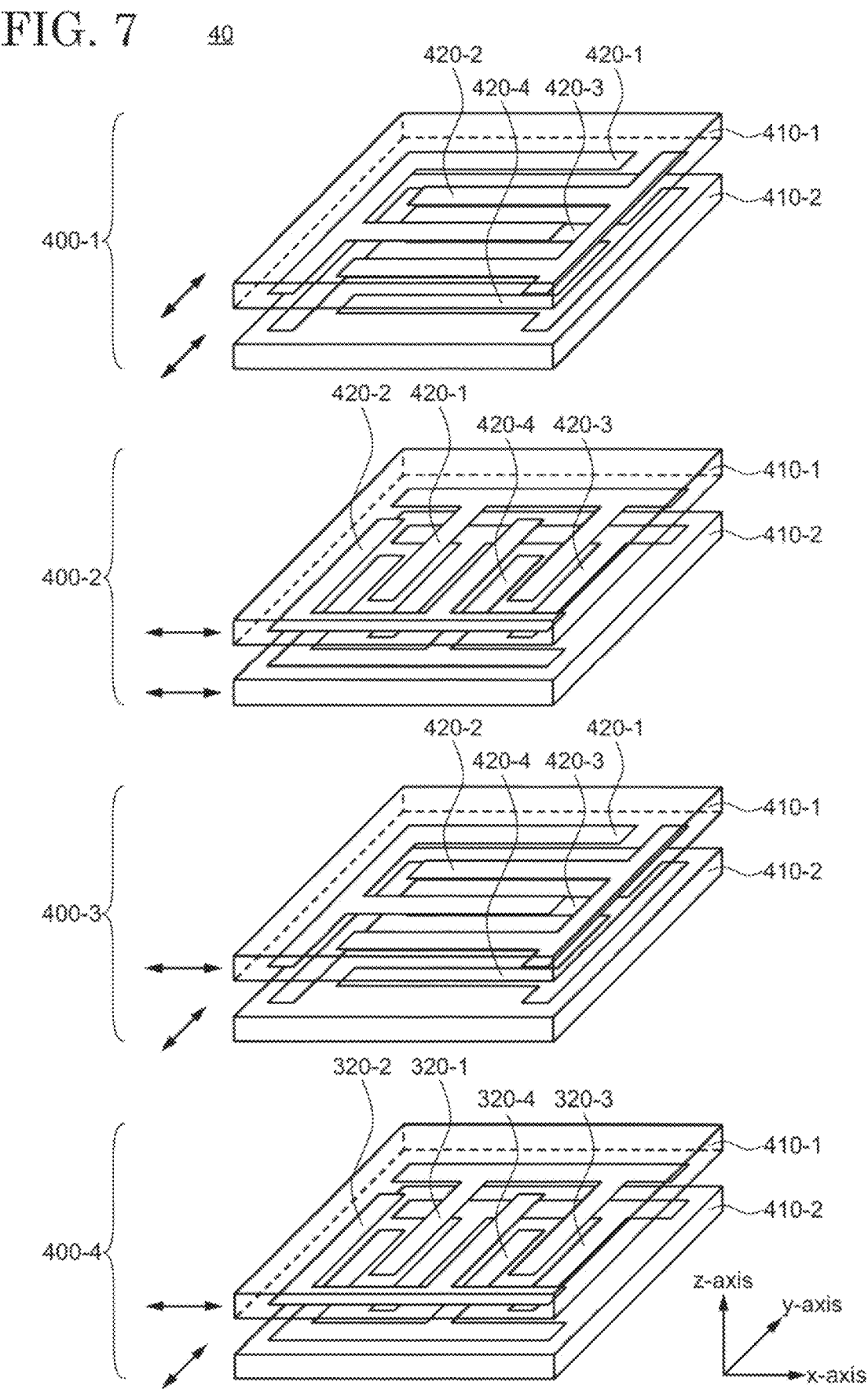
FIG. 7 is a schematic diagram illustrating a relationship between extending directions of transparent electrodes and alignment directions of liquid crystal molecules on the transparent electrodes in a state where no voltages are applied to the transparent electrode of an optical element according to an embodiment of the present invention.

FIG. 7 is a schematic diagram illustrating a relationship between extending directions of transparent electrodes 420 and alignment directions of liquid crystal molecules on the transparent electrodes 420 in a state where no voltages are applied to the transparent electrode 420 of the optical element 40 according to an embodiment of the present invention. In each of a first liquid crystal cell 400-1, a second liquid crystal cell 400-2, a third liquid crystal cell 400-3, and a fourth liquid crystal cell 400-4 of the optical element 40, a first transparent electrode 420-1 and a second transparent electrode 420-2 are provided on a first substrate 410-1 and a third transparent electrode 420-3 and a fourth transparent electrode 420-4 are provided on the second substrate 410-2. Arrows in FIG. 7 indicate the alignment directions (the initial alignment directions) of the liquid crystal molecules closer to each substrate 410. Table 9 shows each parameter of the optical element 30 shown in FIG. 6.

TABLE 9

| | | extending direction of transparent electrode | initial alignment direction of liquid crystal molecules |
|---|---|---|---|
| first liquid crystal cell | first substrate side | x-axis direction | y-axis direction |
| | second substrate side | x-axis direction | y-axis direction |
| second liquid crystal cell | first substrate side | y-axis direction | x-axis direction |
| | second substrate side | y-axis direction | x-axis direction |
| third liquid crystal cell | first substrate side | x-axis direction | x-axis direction |
| | second substrate side | x-axis direction | y-axis direction |
| fourth liquid crystal cell | first substrate side | y-axis direction | x-axis direction |
| | second substrate side | y-axis direction | y-axis direction |

In order to obtain a light distribution having a cross shape by the optical element 40, in each of the first liquid crystal cell 400-1, the second liquid crystal cell 400-2, the third liquid crystal cell 400-3, and the fourth liquid crystal cell 400-4, high voltages are applied to the first transparent electrode 420-1 and the third transparent electrode 420-3, and low voltages are applied to the second transparent electrode 420-2 and the fourth transparent electrode 420-4.

In the first liquid crystal cell 400-1, when voltages are applied to the transparent electrodes 420 as described above, the liquid crystal molecules closer to the first substrate 410-1 are aligned in a convex arc shape in the y-axis direction, and the liquid crystal molecules closer to the second substrate 410-2 are aligned in the y-axis direction. Since the liquid crystal molecules in the first liquid crystal cell 400-1 are not in a twisted state, the liquid crystal layer does not have optical rotation. In the second liquid crystal cell 400-2, the liquid crystal molecules closer to the first substrate 410-1 are aligned in a convex arc shape in the x-axis direction, and the liquid crystal molecules closer to the second substrate 410-2 are aligned in a convex arc shape in the x-axis direction. Since the liquid crystal molecules in the second liquid crystal cell 400-2 are not in a twisted state, the liquid crystal layer does not have optical rotation. In the third liquid crystal cell 400-3, the liquid crystal molecules closer to the first substrate 410-1 rotate from the x-axis direction to the y-axis direction to be aligned in a convex arc shape in the y-axis direction, and the liquid crystal molecules closer to the second substrate 410-2 are aligned in a convex arc shape in the y-axis direction. Since the liquid crystal molecules in the third liquid crystal cell 400-3 are not in a twisted state, the liquid crystal layer does not have optical rotation. In the fourth liquid crystal cell 400-4, the liquid crystal molecules closer to the first substrate 410-1 are aligned in a convex arc shape in the x-axis direction, and the liquid crystal molecules closer to the second substrate 410-2 rotate from the y-axis direction to the x-axis direction to be aligned in a convex arc shape in the x-axis direction. Since the liquid crystal molecules in the fourth liquid crystal cell 400-4 are not in a twisted state, the liquid crystal layer does not have optical rotation. Therefore, when light transmits through the optical element 40, the P-polarization component and the S-polarization component of the light at the time of incidence on the optical element 40 are controlled as shown in Table 10.

TABLE 10

| | | P-polarization component | S-polarization component |
|---|---|---|---|
| first liquid crystal cell | first substrate side | — | diffusion in the y-axis direction |
| | second substrate side | — | diffusion in the y-axis direction |
| second liquid crystal cell | first substrate side | diffusion in the x-axis direction | — |
| | second substrate side | diffusion in the x-axis direction | — |
| third liquid crystal cell | first substrate side | — | diffusion in the y-axis direction |
| | second substrate side | — | diffusion in the y-axis direction |
| fourth liquid crystal cell | first substrate side | diffusion in the x-axis direction | — |
| | second substrate side | diffusion in the x-axis direction | — |

As can be seen from Table 10, in the optical element 40, the P-polarization component of the incident light is diffused four times in the x-axis direction, and the S-polarized light component is diffused four times in the y-axis direction. Further, in the optical element 40, both the P-polarization component and the S-polarization component are diffused not only on the side of the first substrate 410-1 but also on the side of the second substrate 410-2.

As described above, in the optical element 40 according to an embodiment of the present invention, a light distribution having a cross shape can be obtained by increasing the number of times of diffusion compared to the conventional optical element. Therefore, color unevenness in the light distribution having a cross shape can be suppressed. Further, since the number of times of diffusion can be increased without increasing the number of liquid crystal cells 400 in the optical element 40, a decrease in transmittance and an increase in manufacturing cost can be suppressed.

Modification of Fourth Embodiment

A shape of the light distribution obtained by the optical element 40 is not limited to the cross shape. When voltages applied to the transparent electrodes 420 are controlled, various shapes of the light distribution can be obtained. For example, in each of the first liquid crystal cell 400-1 and the second liquid crystal cell 400-2, high voltages are applied to the first transparent electrode 420-1 and the third transparent electrode 420-3, and low voltages are applied to the second transparent electrode 420-2 and the fourth transparent electrode 420-4. Further, in the third liquid crystal cell 400-3, no voltages are applied to the first transparent electrode 420-1 and the second transparent electrode 420-2, and a high voltage and a low voltage are applied to the third transparent electrode 420-3 and the fourth transparent electrode 420-4, respectively. Furthermore, in the fourth liquid crystal cell 400-4, a high voltage and a low voltage are applied to the first transparent electrode 420-1 and the second transparent electrode 420-2, respectively, and no voltages are applied to the third transparent electrode 420-3 and the fourth transparent electrode 420-4.

In the first liquid crystal cell 400-1, when voltages are applied to the transparent electrodes 420 as described above, the liquid crystal molecules closer to the first substrate 410-1 are aligned in a convex arc shape in the y-axis direction, and the liquid crystal molecules closer to the second substrate 410-2 are aligned in a convex arc shape in the y-axis direction. Since the liquid crystal molecules in the first liquid crystal cell 400-1 are not in a twisted state, the liquid crystal layer does not have optical rotation. In the second liquid crystal cell 400-2, the liquid crystal molecules closer to the first substrate 410-1 are aligned in a convex arc shape in the x-axis direction, and the liquid crystal molecules closer to the second substrate 410-2 are aligned in a convex arc shape in the x-axis direction. Since the liquid crystal molecules in the second liquid crystal cell 400-2 are not in a twisted state, the liquid crystal layer does not have optical rotation. In the third liquid crystal cell 400-3, the liquid crystal molecules closer to the first substrate 410-1 are aligned in the x-direction, and the liquid crystal molecules closer to the second substrate 410-2 are aligned in a convex arc shape in the y-direction. Since the liquid crystal molecules in the third liquid crystal cell 400-3 are in a twisted state, the liquid crystal layer has optical rotation. In the fourth liquid crystal cell 400-4, the liquid crystal molecules closer to the first substrate 410-1 are aligned in a convex arc in the x-axis direction, and the liquid crystal molecules closer to the second substrate 410-2 are aligned in the y-axis direction. Since the liquid crystal molecules in the fourth liquid crystal cell 400-4 are in a twisted state, the liquid crystal layer has optical rotation. Therefore, when light transmits through the optical element 40, the P-polarization component and the S-polarization component of the light at the time of incidence on the optical element 30 are controlled as shown in Table 11.

TABLE 11

| | | P-polarization component | S-polarization component |
|---|---|---|---|
| first liquid crystal cell | first substrate side | — | diffusion in the y-axis direction |
| | second substrate side | — | diffusion in the y-axis direction |
| second liquid crystal cell | first substrate side | diffusion in the x-axis direction | — |
| | second substrate side | diffusion in the x-axis direction | — |
| third liquid crystal cell | first substrate side | — | — |
| | second substrate side | diffusion in the y-axis direction | — |
| fourth liquid crystal cell | first substrate side | — | diffusion in the x-axis direction |
| | second substrate side | — | — |

As can be seen from Table 11, when voltages applied to the transparent electrodes 420 are controlled in the optical element 40, the P-polarization component of the incident light is diffused three times and the S-polarization component of the incident light is diffused three times. Specifically, the P-polarization is diffused twice and once in the x-axis direction and the y-axis direction, respectively. The S-polarization component is diffused once and twice in the x-axis direction and the y-axis direction, respectively. Both the P-polarization component and the S-polarization component are diffused not only in the x-axis direction but also in the y-axis direction, and the number of times of the diffusion each in the x-axis direction and the y-axis direction is the same, so that a light distribution having a circular shape is obtained.

As described above in the Modification section, not only the light distribution having a cross shape but also the light distribution having a circular shape can be obtained in the optical element 40 according to an embodiment of the present invention.

Within the scope of the present invention, those skilled in the art may conceive of examples of changes and modifications, and it is understood that these examples of changes and modifications are also included within the scope of the present invention. For example, additions, deletions, or design changes of constituent elements, or additions, omissions, or changes to conditions of steps as appropriate based on the respective embodiments described above are also included within the scope of the present invention as long as the gist of the present invention is provided.

Further, other effects which differ from those brought about by the embodiment, but which are apparent from the description herein or which can be readily predicted by those skilled in the art, are naturally understood to be brought about by the present invention.

What is claimed is:

1. An optical element comprising a plurality of stacked liquid crystal cells, the plurality of liquid crystal cells each comprising:
   a first substrate on which a first transparent electrode, a second transparent electrode, and a first alignment film covering the first transparent electrode and the second transparent electrode are provided;
   a second substrate on which a third transparent electrode, a fourth transparent electrode, and a second alignment film covering the third transparent electrode and the fourth transparent electrode are provided; and a liquid crystal layer between the first substrate and the second substrate,
wherein the plurality of liquid crystal cells comprises a first liquid crystal cell and a second liquid crystal cell,
the first liquid crystal cell comprises:
  the first transparent electrode and the second transparent electrode extending in a first direction,
  the third transparent electrode and the fourth transparent electrode extending in a second direction orthogonal to the first direction,
  the first alignment film aligning liquid crystal molecules in the liquid crystal layer in the second direction when no voltages are applied to the first transparent electrode and the second transparent electrode, and
  the second alignment film aligning liquid crystal molecules in the liquid crystal layer in the second direction when no voltages are applied to the third transparent electrode and the fourth transparent electrode, and
the second liquid crystal cell comprises:
  the first transparent electrode and the second transparent electrode extending in the first direction,
  the third transparent electrode and the fourth transparent electrode extending in the second direction,
  the first alignment film aligning liquid crystal molecules in the liquid crystal layer in the first direction when no voltages are applied to the first transparent electrode and the second transparent electrode, and
  the second alignment film aligning liquid crystal molecules in the liquid crystal layer in the first direction when no voltages are applied to the third transparent electrode and the fourth transparent electrode.

2. The optical element according to claim 1,
wherein the plurality of liquid crystal cells comprises a third liquid crystal cell, and
the third liquid crystal cell comprises:
  the first transparent electrode and the second transparent electrode extending in the second direction,
  the third transparent electrode and the fourth transparent electrode extending in the first direction,
  the first alignment film aligning liquid crystal molecules in the liquid crystal layer in the second direction when no voltages are applied to the first transparent electrode and the second transparent electrode, and
  the second alignment film aligning liquid crystal molecules in the liquid crystal layer in the second direction when no voltages are applied to the third transparent electrode and the fourth transparent electrode.

3. The optical element according to claim 2,
wherein the plurality of liquid crystal cells comprises a fourth liquid crystal cell, and
the fourth liquid crystal cell comprises:
  the first transparent electrode and the second transparent electrode extending in the second direction,
  the third transparent electrode and the fourth transparent electrode extending in the first direction,
  the first alignment film aligning liquid crystal molecules in the liquid crystal layer in the first direction when no voltages are applied to the first transparent electrode and the second transparent electrode, and
  the second alignment film aligning liquid crystal molecules in the liquid crystal layer in the first direction when no voltages are applied to the third transparent electrode and the fourth transparent electrode.

4. An optical element comprising a plurality of stacked liquid crystal cells, the plurality of liquid crystal cells each comprising:
  a first substrate on which a first transparent electrode, a second transparent electrode, and a first alignment film covering the first transparent electrode and the second transparent electrode are provided;
  a second substrate on which a third transparent electrode, a fourth transparent electrode, and a second alignment film covering the third transparent electrode and the fourth transparent electrode are provided; and
  a liquid crystal layer between the first substrate and the second substrate,
wherein the plurality of liquid crystal cells comprises a first liquid crystal cell and a second liquid crystal cell,
the first liquid crystal cell comprises:
  the first transparent electrode and the second transparent electrode extending in a first direction,
  the third transparent electrode and the fourth transparent electrode extending in the first direction,
  the first alignment film aligning liquid crystal molecules in the liquid crystal layer in a second direction orthogonal to the first direction when no voltages are applied to the first transparent electrode and the second transparent electrode, and
  the second alignment film aligning liquid crystal molecules in the liquid crystal layer in the second direction when no voltages are applied to the third transparent electrode and the fourth transparent electrode, and
the second liquid crystal cell comprises:
  the first transparent electrode and the second transparent electrode extending in the second direction,
  the third transparent electrode and the fourth transparent electrode extending in the second direction,
  the first alignment film aligning liquid crystal molecules in the liquid crystal layer in the first direction when no voltages are applied to the first transparent electrode and the second transparent electrode, and
  the second alignment film aligning liquid crystal molecules in the liquid crystal layer in the first direction when no voltages are applied to the third transparent electrode and the fourth transparent electrode.

5. The optical element according to claim 4,
wherein the plurality of liquid crystal cells comprises a third liquid crystal cell, and
the third liquid crystal cell comprises:
  the first transparent electrode and the second transparent electrode extending in the first direction,
  the third transparent electrode and the fourth transparent electrode extending in the first direction,
  the first alignment film aligning liquid crystal molecules in the liquid crystal layer in the first direction when no voltages are applied to the first transparent electrode and the second transparent electrode, and
  the second alignment film aligning liquid crystal molecules in the liquid crystal layer in the second direction when no voltages are applied to the third transparent electrode and the fourth transparent electrode.

6. The optical element according to claim 5,
wherein the plurality of liquid crystal cells comprises a fourth liquid crystal cell, and
the fourth liquid crystal cell comprises:
  the first transparent electrode and the second transparent electrode extending in the second direction, the third transparent electrode and the fourth transparent electrode extending in the second direction, the first alignment film aligning liquid crystal molecules in the liquid crystal layer in the first direction when no voltages are applied to the first transparent electrode and the second transparent electrode, and the second alignment film aligning liquid crystal molecules in the liquid crystal layer in the second direction when no voltages are applied to the third transparent electrode and the fourth transparent electrode.

7. The optical element according to claim 4, wherein the first liquid crystal cell and the second liquid crystal cell are alternately stacked.

8. An optical element comprising a plurality of stacked liquid crystal cells, the plurality of liquid crystal cells each comprising:

a first substrate on which a first transparent electrode, a second transparent electrode, and a first alignment film covering the first transparent electrode and the second transparent electrode are provided;

a second substrate on which a third transparent electrode, a fourth transparent electrode, and a second alignment film covering the third transparent electrode and the fourth transparent electrode are provided; and a liquid crystal layer between the first substrate and the second substrate, wherein the plurality of liquid crystal cells comprises a first liquid crystal cell and a second liquid crystal cell, the first liquid crystal cell comprises:
the first transparent electrode and the second transparent electrode extending in a first direction,
the third transparent electrode and the fourth transparent electrode extending in the first direction,
the first alignment film aligning liquid crystal molecules in the liquid crystal layer in a second direction orthogonal to the first direction when no voltages are applied to the first transparent electrode and the second transparent electrode, and
the second alignment film aligning liquid crystal molecules in the liquid crystal layer in the first direction when no voltages are applied to the third transparent electrode and the fourth transparent electrode, and the second liquid crystal cell comprises:
the first transparent electrode and the second transparent electrode extending in the second direction,
the third transparent electrode and the fourth transparent electrode extending in the second direction,
the first alignment film aligning liquid crystal molecules in the liquid crystal layer in the first direction when no voltages are applied to the first transparent electrode and the second transparent electrode, and
the second alignment film aligning liquid crystal molecules in the liquid crystal layer in the first direction when no voltages are applied to the third transparent electrode and the fourth transparent electrode.

9. The optical element according to claim 8, wherein the first liquid crystal cell and the second liquid crystal cell are alternately stacked.

* * * * *